(12) United States Patent
Kadoko et al.

(10) Patent No.: US 11,718,195 B2
(45) Date of Patent: Aug. 8, 2023

(54) AUTOMATIC ELECTRIC VEHICLE CHARGING DEVICE

(71) Applicant: ABB Schweiz AG, Baden (CH)

(72) Inventors: Jonah Kadoko, Mint Hill, NC (US); Matthew Hetrich, Raleigh, NC (US); Gregory A. Cole, West Hartford, CT (US); William J. Eakins, Coventry, CT (US)

(73) Assignee: ABB E-mobility B.V., Delft (NL)

( * ) Notice: Subject to any disclaimer, the term of this patent is extended or adjusted under 35 U.S.C. 154(b) by 475 days.

(21) Appl. No.: 16/869,725

(22) Filed: May 8, 2020

(65) Prior Publication Data

US 2021/0347274 A1    Nov. 11, 2021

(51) Int. Cl.
| | |
|---|---|
| *B60L 53/35* | (2019.01) |
| *B60L 53/16* | (2019.01) |
| *H02J 7/00* | (2006.01) |
| *H02K 7/116* | (2006.01) |
| *B25J 9/10* | (2006.01) |
| *B25J 9/16* | (2006.01) |
| *B25J 13/08* | (2006.01) |

(Continued)

(52) U.S. Cl.
CPC ............ *B60L 53/35* (2019.02); *B25J 9/1035* (2013.01); *B25J 9/161* (2013.01); *B25J 9/1697* (2013.01); *B25J 13/089* (2013.01); *B25J 18/007* (2013.01); *B60L 53/16* (2019.02); *H02J 7/0042* (2013.01); *H02K 7/116* (2013.01); *G06F 3/14* (2013.01)

(58) Field of Classification Search
CPC .......... B60L 53/35; B60L 53/16; H02J 7/0042
USPC ......................................................... 320/109
See application file for complete search history.

(56) References Cited

U.S. PATENT DOCUMENTS

| | | | |
|---|---|---|---|
| 9,770,993 B2* | 9/2017 | Zhao ....................... B60L 53/51 |
| 11,338,694 B1* | 5/2022 | Peeler ..................... B60L 53/16 |
| 11,376,978 B1* | 7/2022 | Peeler ..................... B60L 53/35 |

(Continued)

FOREIGN PATENT DOCUMENTS

| | | |
|---|---|---|
| CN | 102699930 B | 2/2015 |
| WO | WO 2019/110724 A1 | 6/2019 |

(Continued)

OTHER PUBLICATIONS

Coxworth, "Robotic system identifies EVs and charges them up," *New Atlas*, downloaded from the Internet on Jun. 23, 2021, at https://newatlas.com/robotic-ev-charging/55874/, 9 pp. (Aug. 13, 2018).

(Continued)

*Primary Examiner* — Suchin Parihar
(74) *Attorney, Agent, or Firm* — Leydig, Voit & Mayer, Ltd.

(57) ABSTRACT

A charging device autonomously charges an electric vehicle. The charging device includes: a main body and an arm coupled to the main body. The main body is controllably moveable, and the arm is controllably extendable and retractable in a longitudinal direction. A charging plug is included at a distal end of the arm. The charging plug is controllably moveable and insertable into a charging portal of the electric vehicle. The arm comprises: a rigid chain, the rigid chain being compliant in a first direction from a neutral axis and resistant in an opposite second direction past the neutral axis, or at least one scissor arm.

20 Claims, 9 Drawing Sheets

(51) Int. Cl.
    *B25J 18/00*     (2006.01)
    *G06F 3/14*     (2006.01)

(56) References Cited

U.S. PATENT DOCUMENTS

| | | |
|---|---|---|
| 2010/0235006 A1 | 9/2010 | Brown |
| 2012/0233662 A1* | 9/2012 | Scott-Cowley ......... H04L 51/04 709/204 |
| 2013/0076902 A1* | 3/2013 | Gao ........................ B60L 53/31 348/148 |
| 2013/0221177 A1* | 8/2013 | Ishii ........................ B60L 53/16 248/299.1 |
| 2014/0067660 A1* | 3/2014 | Cornish ................ B60L 53/305 705/39 |
| 2014/0354229 A1* | 12/2014 | Zhao ....................... B60L 53/68 320/109 |
| 2016/0123521 A1 | 5/2016 | Raabe et al. |
| 2018/0143035 A1* | 5/2018 | Ricci .................. G06Q 30/0266 |
| 2021/0053456 A1* | 2/2021 | Freeling-Wilkinson ..................... B60L 53/18 |
| 2021/0086641 A1* | 3/2021 | Fuhlbrigge ............. B60L 53/35 |
| 2022/0379758 A1* | 12/2022 | Hetrich ................ H01R 13/631 |

FOREIGN PATENT DOCUMENTS

| | | |
|---|---|---|
| WO | WO 2021/059064 A1 | 4/2021 |
| WO | WO 2021/059065 A1 | 4/2021 |

OTHER PUBLICATIONS

Dykhuizen, "ROCSYS automates charging stations with soft robots," *Charged EVs*, downloaded from the Internet on Jun. 23, 2021, at https://chargedevs.com/features/rocsys-automates-charging-stations-with-soft-robots/, 7 pp. (Mar. 4, 2020).
European Patent Office, International Search Report in International Patent Application No. PCT/IB2021/053352, 7 pp. (Aug. 31, 2021).
European Patent Office, Written Opinion in International Patent Application No. PCT/IB2021/053352, 12 pp. (dated Aug. 31, 2021).

* cited by examiner

AUTOMATIC ELECTRIC VEHICLE CHARGING DEVICE

FIELD

The present disclosure relates to an automatic electric vehicle charging device.

BACKGROUND

Automatic charging of electric vehicles (EVs) is perceived in the EV industry as an important business opportunity because it enables a high degree of safety during charging, which, in turn, enables use of high charging power ratings (fast-charging), improves operational efficiency in charging fleet vehicles or vehicles at a public charge station, and increases customer comfort.

Automatic charging can be made possible using mobile robots or robotic arms capable of interacting with the EV charging equipment and EVs. However, conventional mobile robots and robotic arms that are capable of interfacing with EV charging equipment and EVs have significant drawbacks. For example, conventional robotic solutions often require a substantial amount of physical space for installation and operation. Yet, in some customer locations, space is limited, making robotic EV charging systems impractical. Additionally, employing conventional robots (particularly more sophisticated and compact robots) can be expensive, not only as a total system cost but also the cost to manufacture the robots. Furthermore, robotic solutions can impose an increased safety risk (e.g., due to the high forces robots can exert) and conventional robotic systems may not be able to safely operate in an environment where untrained users are present.

SUMMARY

The present disclosure provides a robotic, autonomous electric charging device, and a charging system, including the electronic charging device, that provide an efficient, compact, and cost effective solution for providing automated charging of EVs. Furthermore, the electric charging device and system enhance the safety and convenience for charging EVs. Additionally, the present disclosure provides a method and a control system, including a computer readable medium comprising computer instructions, for operating the device and system to provide at least the same advantages.

A first aspect of the present disclosure provides a charging device for autonomously charging an electric vehicle. The charging device includes: a main body, which is controllably moveable; an arm coupled to the main body, which is controllably extendable and retractable in a longitudinal direction; and a charging plug at a distal end of the arm, the charging plug configured to be controllably moveable and insertable into a charging portal of the electric vehicle. The arm includes: a rigid chain, the rigid chain being compliant in a first direction from a neutral axis and resistant in an opposite second direction past the neutral axis, or at least one scissor arm.

According to an implementation of the first aspect of the present disclosure, the charging device includes a cassette, which is configured to controllably extend and retract the rigid chain. The cassette includes: a main bracket connected to the main body within the housing; a gear wheel rotatably mounted in the main bracket, the gear wheel being controllably rotatable about a gear wheel axis; and a feeding chute at least partially surrounding the gear wheel, the feeding chute having a first side wall, a second side wall, and a base. The first side wall, the second side wall, and the base form a channel to guide the rigid chain, an exit side of the channel forming a feed point that is configured to direct an exit of the rigid chain from the main body. The feeding chute is configured such that the base holds a portion of the rigid chain in communication with the gear wheel. The arm includes the rigid chain.

According to an implementation of the first aspect, the cassette includes: a gear wheel motor connected to the main bracket; and a driving gear concentrically connected to the gear wheel. The driving gear is in mechanical communication with the gear wheel motor. The driving gear is configured to be reversibly driven by the gear wheel motor to controllably rotate the gear wheel to feed and retract the rigid chain to effect a longitudinal position of the charging plug at the distal end of the arm.

According to an implementation of the first aspect, the cassette includes a feeding chute motor. At least one of the first side wall or the second side wall of the feeding chute has a curved gear profile portion in mechanical communication with the feeding chute motor. The feeding chute is rotatably mounted to the main bracket. The feeding chute motor is configured to controllably rotate the feeding chute to adjust the position of the feeding point to effect a vertical positioning of the charging plug at the distal end of the arm.

According to an implementation of the first aspect, the first side wall and the second side wall have a same profile. The feeding chute motor is in mechanical communication with the gear profile portion of the first side wall. Either a second feeding chute motor or an idler gear is in mechanical communication with the gear profile portion of the second side wall.

According to an implementation of the first aspect, the gear wheel has a spool shape, having a central cylinder of a first diameter, and a first side disc and a second side disc on each side of the central cylinder, each having a second diameter larger than the first diameter. A width of the central cylinder corresponds to a major width of a link of the rigid chain. The first side disk and the second side disk each have a gear profile, valleys of the gear profile being configured to mechanically communicate with rivets of the link. The first side disk and the second side disk are configured to cover at least a portion of sides of the link.

According to an implementation of the first aspect, the charging device includes a support tray attached to the cassette. The support tray is configured to extend with the rigid chain to provide relief support of the rigid chain at a point away from the main body. The support tray includes a spring configured to provide an extending force.

According to an implementation of the first aspect, the charging device includes an arm support configured to provide relief support of the arm at a point away from the main body. The arm support is configured to extend longitudinally as the arm is extended and retract as the arm retracts.

According to an implementation of the first aspect, a guide is arranged within a housing of the main body. The guide is configured to guide the rigid chain to fold upon itself for compact storage.

According to an implementation of the first aspect, the arm includes the rigid chain and includes a connecting link attached to an originating end of the rigid chain. The connecting link couples the rigid chain to the main body, and the connecting link has an open top configured to provide clearance for cable bend.

According to an implementation of the first aspect, the connecting link is rotatably coupled to the main body such that the connecting link is pivotable around an anchor point.

According to an implementation of the first aspect, the main body is controllably moveable in at least one of a rotational, vertical, or lateral direction.

According to an implementation of the first aspect, the charging plug is attached to the arm via a platform, the platform being controllably moveable to orient or position the charging plug.

According to an implementation of the first aspect, at least one actuator is configured to move the platform. The at least one actuator is provided at the platform, a holder connecting the charging plug to the platform, or the main body.

According to an implementation of the first aspect, the charging device includes a control system. The control system includes a controller and a sensor. The controller is configured to: receive a signal from the sensor; determine control signals based on the signal; and send the control signals to move the charging plug and to insert the charging plug into the charging portal.

According to an implementation of the first aspect, the sensor is a single two-dimensional camera attached at the charging plug.

According to an implementation of the first aspect, the sensor is configured to provide the signal as an image or video signal. The control system is configured to operate a convolutional neural network, the convolutional neural network being trained to infer positions of at least one of the distal end of the arm, the charging plug, or the charging portal from the image or video signal. The control system, using the convolutional neural network, is configured to: interpret the signal received from the sensor to perform at least one of image recognition, image classification, or pose estimation; and determine the positions of at least one of the arm, the charging plug, or the charging portal based on at least one of the image recognition, the image classification, or the pose estimation.

According to an implementation of the first aspect, the charging device includes: a plurality of motors collectively configured to position a distal end of the arm within a working volume defined by a vertical axis, a longitudinal axis, and a lateral axis, at least one actuator configured to tilt the charging plug. The controller is configured to: detect positions of at least one of: the distal end of the arm, the charging plug, or the charging portal based on the signal from the sensor; send motor control signals that are configured to controllably operate the motors to position and orient the arm within the working space to a position where the charging portal is reachable by the charging plug; send actuator control signals that are configured to adjust the orientation or the position of the charging plug to align the charging plug with the charging portal; send the motor control signals that are configured to operate the motors to insert the charging plug into the charging portal; and send the motor control signals that are configured to retract the arm to its fully retracted state.

According to an implementation of the first aspect, the control system includes: motor sensors configured to detect states of the plurality of motors and the at least one actuator and provide corresponding feedback signals; a motor controller configured to: receive the feedback signals, the motor control signals, and the actuator control signals; determine motor driver signals and actuator driver signals based on the feedback signals, the motor control signals, and the actuator control signals; and send the motor driver signals and the actuator driver signals to at least one motor driver; and the at least one motor driver, which is configured to: receive the motor driver signals and the actuator driver signals; and send individual operation signals to the motors and the at least one actuator based on the motor driver signals and the actuator driver signals.

According to an implementation of the first aspect, the controller is configured to send user interface signals to a user interface, the user interface signals corresponding to at least one of localization information, position feedback information, or charging information. The user interface includes at least one of: a local interface in the charging device, a projector in the charging device configured to project an image, or a remote interface.

The charging device according to the first aspect of the present disclosure may be variously configured to include any combination of the above-described implementation forms.

A second aspect of the present disclosure provides a cassette for an extendable and retractable arm comprising a rigid chain, the rigid chain being compliant in a first direction from a neutral axis and resistant in an opposite second direction past the neutral axis. The cassette is configured to controllably extend and retract the rigid chain. The cassette may be configured as the cassette according to the first aspect, including all implementation forms.

A third aspect of the present disclosure provides a charging system for autonomously charging an electric vehicle. The charging system includes a power supply and a charging device, coupled to the power supply. The charging device of the charging system may be configured as the charging device according to the first aspect, including all of its implementation forms.

According to an implementation of the third aspect, the charging system includes the charging device mounted on at least one of: a wall, a floor, or a ceiling.

According to an implementation of the third aspect, the power supply is provided within a housing of the charging device or as a separate unit.

According to an implementation of the third aspect, the charging system includes a user interface, the user interface being at least one of: a projector and projection screen, a display on the charging device, a mobile device in wireless communication with the charging device, or a display of the electric vehicle in wireless communication with the charging device.

The charging system according to the third aspect of the present disclosure may be variously configured to include any combination of the above-described aspects in their various implementation forms.

A fourth aspect of the present disclosure provides a computer readable medium storing computer executable code, which when executed by a controller of a charging device, causes the controller to: receive a signal from a sensor; determine control signals based on the signal; and send the control signals to move a charging plug, of the charging device, and to insert the charging plug into a charging portal of an electric vehicle.

According to an implementation of the fourth aspect, the charging device may be a charging device according to a first aspect, including any combination of its implementation forms.

According to an implementation of the fourth aspect, the sensor is a single two-dimensional camera attached at the charging plug.

According to an implementation of the fourth aspect, the sensor is configured to provide the signal as an image or video signal. The computer executable code, when executed by the controller, causes the controller to: operate a convolutional neural network, the convolutional neural network being trained to infer positions of at least one of the distal end of the arm, the charging plug, or the charging portal from the image or video signal; using the convolutional neural network, interpret the signal received from the sensor to perform at least one of image recognition, image classification, or pose estimation; and determine the positions of at least one of the arm, the charging plug, or the charging portal based on at least one of the image recognition, the image classification, or the pose estimation.

According to an implementation of the fourth aspect, the computer executable code, wen executed by the controller, causes the controller to: detect positions of at least one of: the distal end of the arm, the charging plug, or the charging portal based on the signal from the sensor; send motor control signals that are configured to controllably operate the motors to position and orient the arm within the working space to a position where the charging portal is reachable by the charging plug; send actuator control signals that are configured to adjust the orientation or the position of the charging plug to align the charging plug with the charging portal; send the motor control signals that are configured to operate the motors to insert the charging plug into the charging portal; and send the motor control signals that are configured to retract the arm to its fully retracted state.

According to an implementation of the fourth aspect, a charging device includes motor sensors configured to detect states of the plurality of motors and the at least one actuator and provide corresponding feedback signals. The computer executable code, when executed by the controller (or a motor controller) causes the controller (or the motor controller) to: receive the feedback signals, the motor control signals, and the actuator control signals; determine motor driver signals and actuator driver signals based on the feedback signals, the motor control signals, and the actuator control signals; and send the motor driver signals and the actuator driver signals to at least one motor driver. The computer executable code, when executed by the controller (or motor controller or a motor driver) causes the controller (or the motor controller or the motor driver) to: receive the motor driver signals and the actuator driver signals; and send individual operation signals to the motors and the at least one actuator based on the motor driver signals and the actuator driver signals.

According to an implementation of the fourth aspect, the computer executable code, when executed by the controller, causes the controller to send user interface signals to a user interface, the user interface signals corresponding to at least one of localization information, position feedback information, or charging information.

The computer readable medium according to the fourth aspect of the present disclosure may be variously configured to include any combination of the above-described aspects in their various implementation forms.

A fifth aspect of the present disclosure provides a method for operating a charging device according to the above-described aspects, in their various implementation forms.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following.

DETAILED DESCRIPTION

Figure 1A:
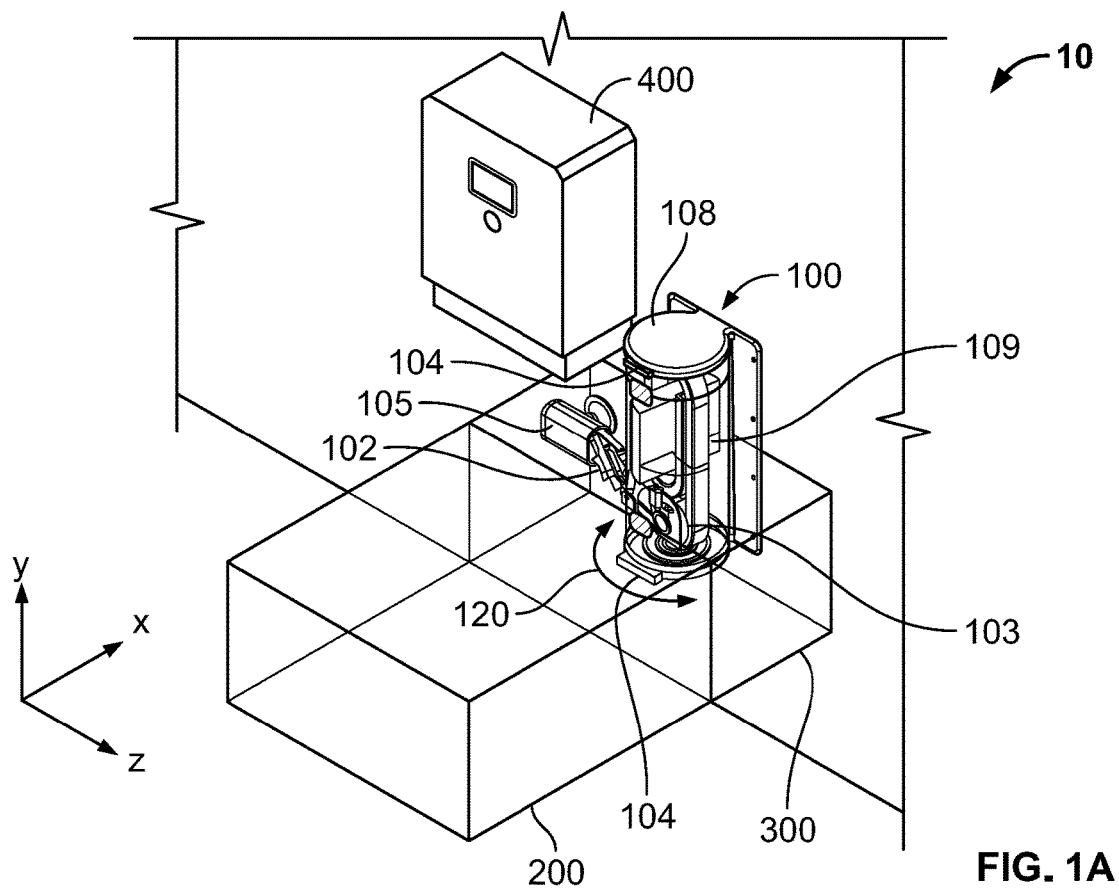
FIG. 1A illustrates a charging system according to an embodiment of the present disclosure in a collapsed, docked state.

The present disclosure describes an automatic electric vehicle (EV) charging device and system, which provides advantages over the state of the art. For example, the electric charging device provides an efficient, compact, and cost effective solution for providing automated charging of EVs. Furthermore, the electric charging device and system enhance the safety and convenience for charging EVs. While embodiments of the charging device and system described herein are depicted as being for charging vehicles with a side body inlet, the disclosure is not so limited (e.g., moving the mounting position of the charging device or positioning of the EV can allow for accessing charging portals at other locations).

An automatic (e.g., an automated-robotic) EV charging device, according to an aspect of the present disclosure, includes an extensible and collapsible arm and a charging plug (e.g., an EV charging plug, such as a Combined Charging System Type 2 (CCS2) plug), which interfaces with an EV charging portal. The arm may be cantilevered and gear driven. The charging plug may be mounted on a platform at the cantilevered end of the arm, with the platform providing fine-tuned orientation (e.g., tilting) of the charging plug. In a fully extended state, the arm is rigid enough to support its own weight, weight of accessories (e.g., charging plug, sensors, wires, etc.), and a reaction force during plug insertion and withdrawal. In a fully retracted state, the arm is folded upon itself to enable maximum utilization of space. A rigid chain (such as produced by Serapid and Tsubaki) may therefore be used as the arm.

An advantage of the charging device is that the total package size of the robotic charging device is very compact (e.g., similar to that of a DC power supply wall box), particularly when not in use. The compactness of the charging device is enabled by the efficient layout and use of components, particularly the use of an extensible and collapsible arm.

The charging device is further configured to automatically (e.g., without human intervention or human interaction) extend and position the arm from a retracted state to a state where the charging plug can interface with the EV charging portal to charge the EV. The charging device can further automatically control the orientation and position of the charging plug (e.g., via the platform) independently from the arm to provide the fine-tuned orientation (e.g., pitch, roll, and/or yaw) to accurately align the charging plug with the EV charging portal, and automatically insert the charging plug into the EV charging portal. The charging device can then supply power through the charging plug to charge the EV. Upon completion of the charging, the charging device can automatically withdraw the charging plug from the EV charging portal, retract the arm, and store the charging plug in a docking station.

The charging device may also include a controller in communication with sensors, such as camera and proximity sensors, an on-board EV system, to enable the automated control the charging device. The sensors may be utilized to detect and measure a location of an EV and its charging portal, within the working range, and detect and measure a relative position of the charging plug. Accordingly, the controller can use signals received from the sensors for feedback control of the position and orientation of the arm, the main body, and charging plug with respect to the charging portal of an EV. The sensors may be variously located on the charging device, including at the charging plug, the platform, or on the body of the charging device. For example, a sensor at the main body may detect a reflector at the charging plug to determine a lateral, longitudinal, and vertical position the arm charging plug. In a preferred embodiment, the charging device uses a single 2D camera positioned adjacent to the plug head of the charging plug.

The charging device may also be movable at its main body to enable a larger charging area for positioning the EV. For example, in an embodiment the main body of the charging device is capable of rotating in the horizontal plane (i.e., side-to-side rotation) thereby allowing a larger space for the arm to extend into. In another embodiment, the main body of the charging device is capable of translating perpendicular to the direction of the vehicle (lateral side-to-side movement). The main body of the charging device may also (alternatively or additionally) be moveable in a vertical direction.

Exemplary aspects of the charging systems and charging devices, according to the present disclosure, are further elucidated below in connection with exemplary embodiments, as depicted in the figures. The exemplary embodiments illustrate some implementations of the present disclosure and are not intended to limit the scope of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

Figure 1B:
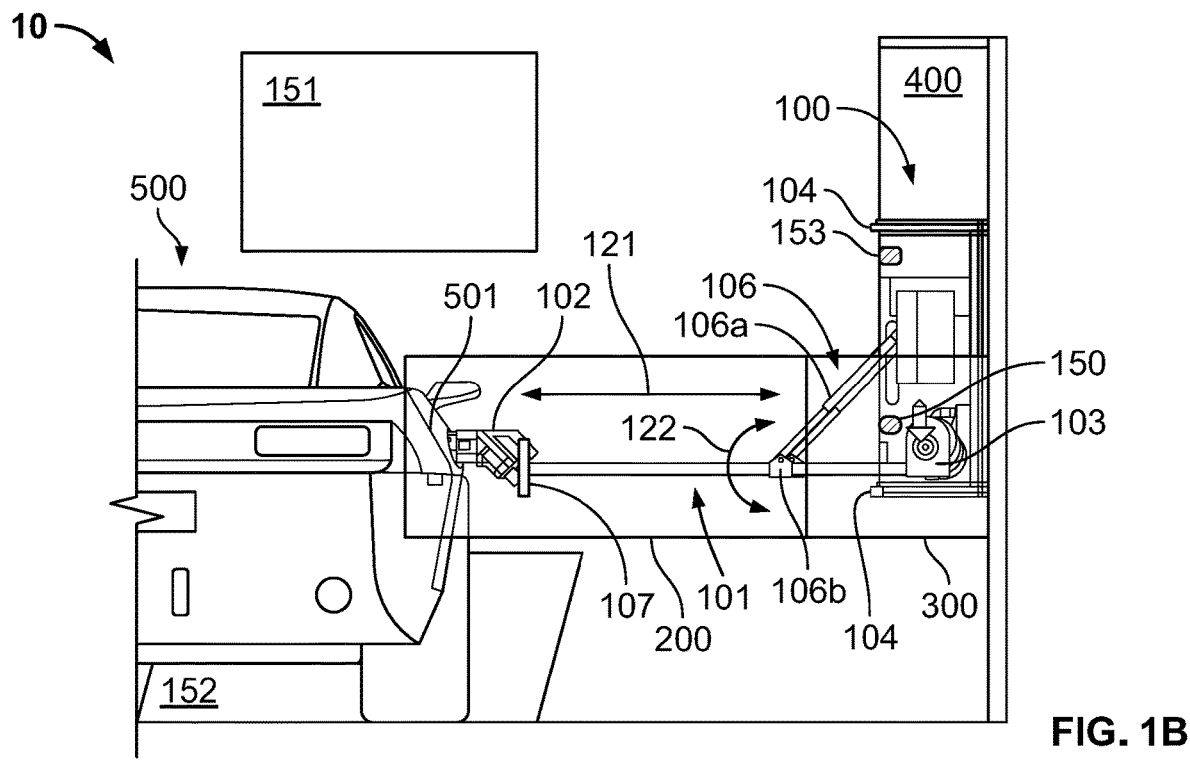
FIG. 1B illustrates the charging system of FIG. 1A in a charging state.

FIG. 1A illustrates a charging system according to an embodiment of the present disclosure in a collapsed, docked state; and FIG. 1B illustrates the same charging system of the present disclosure in a charging state.

As shown in FIGS. 1A and 1B, the charging system 10 includes an automated-robotic charging device 100 and a power supply 400. The power supply 400 may be an EVCU (EV Charging Unit), which supplies high voltage for charging. The power supply 400 is usable with or without the charging device 100. The charging system 10 is configured to automatically and conveniently charge an EV 500, without human intervention or interaction, thus, providing a safe and convenient charging experience for the EV user. Additionally, the charging system 10 is compact. That is, the space required to provide the complete charging system is reduced over conventional solutions. Indeed, the charging system is capable of being mounted on a wall, ceiling, or pole, with the charging device 100 occupying approximately the same amount of space as a conventional power supply 400.

The power supply 400 receives AC power (e.g., from a utility power supply), and converts and conditions the main supply to a power suitable for charging an EV (e.g., a DC voltage with a sufficient current rating for rapid charging of EVs). The power supply 400 is electrically coupled to the charging device 100 to provide the charging power to the charging device 100. The charging device 100 may then supply the charging power to the EV 500, in an automated and hands-free manner. A control system of the charging device may communicate with the power supply 400 (e.g., to provide loose or tight control of the charging).

The charging system 10 can automatically detect when an EV 500 is within a predetermined proximity (i.e., within or reachable from a working volume 200) to the charging device 100 and determine a location of the charging portal 501 on the EV 500. If the EV 500 and its charging portal 501 are determined to be within reach of the charging device, the charging device maneuvers the arm 101 to position the charging plug 102, such that it is in close proximity to the charging portal 501. When the charging plug 102 is determined to be within close proximity to the charging portal 501, the charging device 100 fine-tunes the position and orientation of the charging plug 102, such that it is aligned for insertion into the charging portal 501 of the EV 500. The charging device 100 then inserts the charging plug 102 into the charging portal 501, and the EV 500 can then be charged. While the above movement and orientation of the arm 101 and charging plug 102 were described sequentially, a charging device 100 may dynamically move its arm 101 and charging plug 102 in any order (including contemporaneously), providing for a smooth movement and insertion of the charging plug 102 into the charging portal 501.

Once the charging is completed (or is otherwise stopped), the charging device 100 removes the charging plug 102 from the charging portal 501, and retracts the arm 101. In the present embodiment, the charging system includes a holder 105 for protecting the charging plug 102. Accordingly, the charging device 100, after retracting the arm 101, may rotate to a stowage position, and insert the charging plug 102 into the holder 105.

The working volume 200 of the charging device 100 is a physical space in which the charging device 100 can maneuver its arm 101 and engage its charging plug 102 with the charging portal 501 of the EV 500 (i.e., a volume of functional access). A non-working volume 300 of the charging device 100 is a physical space near the charging device where the charging device 100 is configured such that it will not attempt to charge an EV that is within that space. The non-working volume 200 may include spaces where the EV device is incapable of effectively plugging in its charging plug 102 into the charging portal 501, whether because of a mechanical collision or inability to obtain a proper orientation, and/or a buffer space to provide a safe walking distance for human occupants. Accordingly, the charging device 100 will not attempt to move or otherwise engage with the EV 500 when the EV 500 is within the non-working area 300. As defined herein, a y-axis of the physical space is in a vertical direction (as oriented by gravity), the x-axis is in longitudinal direction (as defined by the space between the charging device 100 and the EV 500), and the z-axis is in a lateral direction (perpendicular to the x- and y-axes).

The working volume 200 is defined by the mechanical and kinematic abilities of the charging device 100 and the arrangement of the charging system 10 in its installation space. The working volume 200 of the present embodiment of the charging device 100 is, therefore, defined (at least in part) by the range of motion it can impart on the arm 101 and the reach of its charging plug 102. That is, the physical space defined as the working volume in FIGS. 1A and 1B includes locations to which the tip (distal end) of the arm can reach and locations to which the charging plug 102 can be inserted. The charging device 100 is capable of at least rotating (yaw), pitching, and extending/retracting its arm 101. That is, the kinematics of charging device 100 of the present embodiment includes rotational movement in the z-axis (lateral direction), rotational movement in the y-axis (vertical direction), and linear movement in the x-axis (longitudinal direction).

The charging device 100 of the present embodiment controllably rotates its arm 101 by rotating its main body 108 about a rotation axis that runs down the center (approximately) of the main body (z-direction rotation). Because the arm is contained within the main body 108, moving the main body 108 in a lateral rotational direction 120 (z-direction rotation) similarly rotates the arm 101.

The charging device 100 of the present embodiment controllably extends/retracts its arm 101 by extending/retracting the arm from a cassette 103. That is, the cassette 103 controllably, and reversibly feeds the arm 101 in a longitudinal direction 121 (linear x-direction movement).

The charging device 100 of the present embodiment controllably pitches (or tilts) the arm by adjusting the angle at which the cassette 103 feeds the arm 101. That is, by moving the angle of the feed point, the cassette 103 can direct the exit of the arm 102 at that particular angle, imparting an elevation change in the arm 101. Accordingly, the arm 101 can be moved in a vertical rotational direction 122 (y-direction rotation).

The charging device 100 can further controllably orient and move the charging plug 102 independently of the arm 101. This provides an extended range of motion and orientation that enables the charging device 100 to accurately position the charging plug for insertion into the charging portal 501.

In the present embodiment, the charging device 100 includes a platform 107 to enable fine-tuned positioning and orientation of the charging plug. For example, the platform 107 can provide one, two, or three-degrees of freedom (e.g., pitch, yaw and/or roll) for adjusting the position and orientation of the charging plug. The platform 107 can, thus, be controlled to accurately align the charging plug 107 for insertion into the EV charging portal 501.

The charging device 100 also includes an arm support 106. The arm support 106 provides an anchor and support point for holding and cantilevering the arm 101. That is, the arm support 106 provides relief support for the arm 101 at a point away from the main body 108. The arm support 106 thus enables a heavier weight to be attached to a distal end of the arm 101, and enables the arm 101 to extend further away from the main body 108 (as compared to a device without an arm support). The arm support 106 may be configured to extend in the longitudinal direction (x-direction) as the arm extends, and to retract with the arm (once the arm reaches a preset retraction point).

In the present embodiment, the arm support 106 includes two support arms 106a, each having one end anchored to the main body 108 and their opposite end attached to a support sling 106b. The support sling 106b is in contact with at least a bottom side of the arm 101 and supports the weight of the arm 101. The support sling 106b may freely slide as the arm extends and moves. That is, the support sling 106b need not be fixedly attached to the arm 101. The support arms 106a may be configured as hydraulic dampeners that are tuned to allow relief support of the arm 101, but do not pull the arm 101 out of its position. Alternatively, the support arms 106a may be configured as actuators (e.g., rams) that are controllably extendable/retractile to move the cassette 103 (or assist with moving the cassette 103) to provide adjustment to the feed angle.

While the present embodiment uses a support arm with a support sling to provide relief support of the arm, other support devices are contemplated within the scope of the present invention. For example, as described below, a sliding support tray or drivable support ram may be used to provide relief support of the arm. According to an embodiment, the support arm 106 (or other support device) provides a support point at least up to 0.5 meters from the main body 108, and more preferably up to 1.5 meters from the main body 108. According to one implementation form, the support arm 106 (or other support device) provides a support point up to ⅓ of the total length of the fully extended arm, and is configured to support the weight of the arm 101 and its load (e.g., cabling, charging plug 102, etc.).

The main body 108 includes a housing 109 that encloses and protects the kinematic and electrical components of the charging device. For example, the housing 109 encloses the cassette 103 for the arm 101, the collapsed arm, motors, gears, actuators, a control system, and other sub-systems (e.g., cooling fans, power supplies, I/O connectors).

The charging system 10 may also include a user feedback/user interface (UI) for communicating with the driver of the EV or otherwise communicating with a user of the charging system.

For example, the charging system 10 may include a UI/perception display 153. The display 153 can provide feedback to a user (e.g., localization or charging feedback). For example, the display 153 can inform the user in real time with respect to the position of the vehicle and the status of the charger. With regard to the localization/position feedback, the display 153 can give a signal for the user on positioning/stopping the EV 500 (similar to what a user may experience at a drive-through car wash). For example, the display 153 may alert the user to move forward, back, or angle right/left. With regard to the charging state, the display 153 may alert the user to a charging status, e.g., charging, charged, percent charge, or remaining charge time. As should be apparent, other user feedback information is contemplated within the scope of this disclosure.

The display 153 may be mounted on the main body 108 of the charging device 100 (as in the present embodiment). The display 153 may, however, alternatively or additionally be provided external to the charging device 100. For example, a display may be at a remote mount, which is positioned near the EV 500 (such as a control point for paying for (or interacting with) the charging system 10). A projector 150 may also project a projected image 151 conveying user feedback information. The charging device 100 may also wirelessly transmit (e.g., via Bluetooth, Wi-Fi, etc.) the user feedback information to a user device (e.g., a mobile telephone or display of the EV 500).

A projector 150 may additionally or alternatively project a positioning image 152 on the ground (or other surface, e.g., a wall) to help guide the user in positing the EV 500. For example, the positioning image may provide a box, color coded image, or video display of the actual position of the EV 500.

The charging system 10 also includes sensors 104. The sensors 104 may be attached to or included in the main body 108, the charging plug 102, the platform 107, or any other part of the charging system 10 (e.g., at the EV 500). The sensors 104 include visualization and/or localization sensors that form part of the control system for automatically controlling the charging device 100 to maneuver and orient the charging plug 102 into the charging portal 501 for charging the EV 500. According to an embodiment, the sensors 104 preferably provide a view of the charging plug 102 and EV 500 in one scene.

Figure 2:
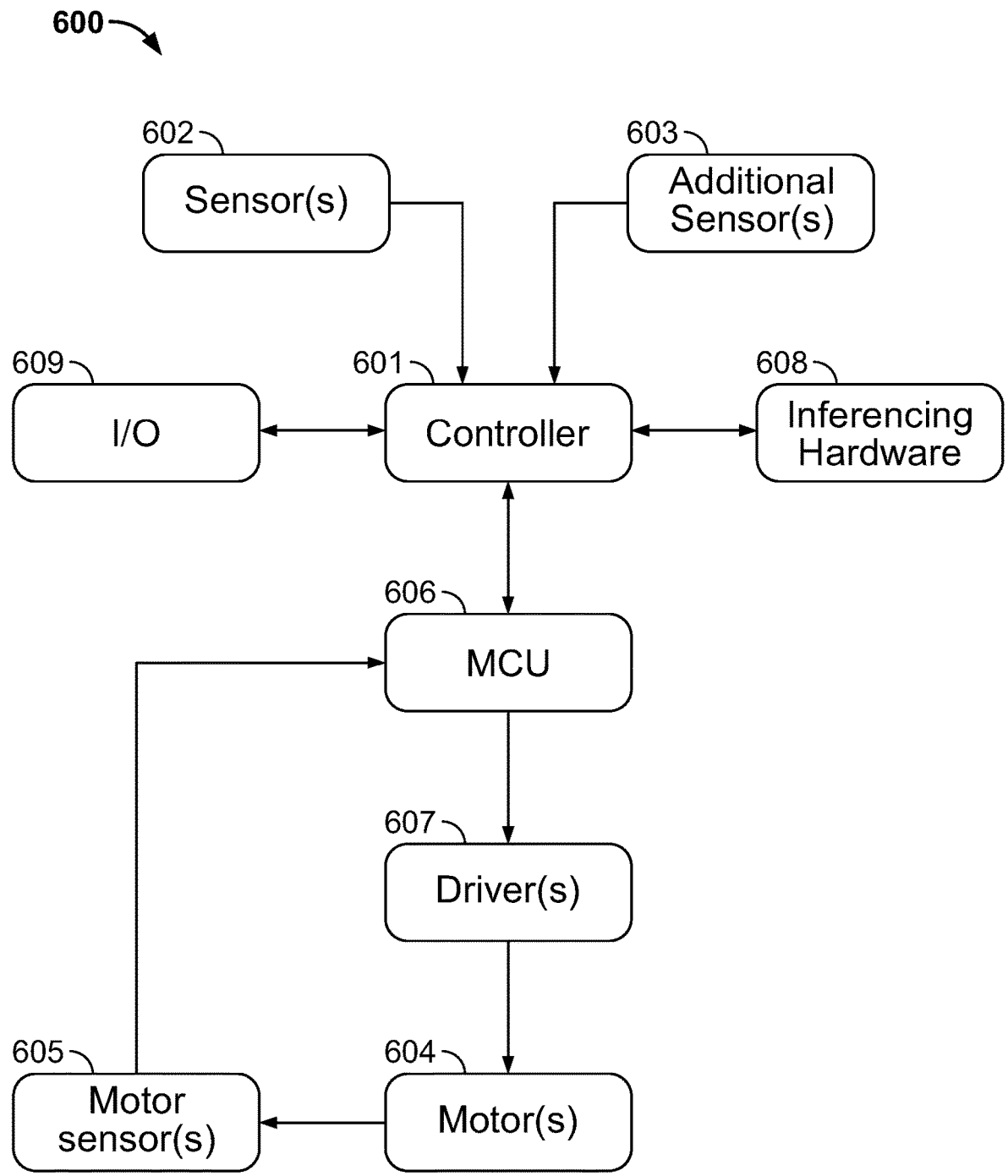
FIG. 2 is a schematic illustration of a control system according to an embodiment of the present disclosure.

FIG. 2 provides a schematic of a control system 600 according to an embodiment of the disclosure.

The control system 600 includes a controller 601. The controller 601 is not constrained to any particular hardware, and the controller's configuration may be implemented by any kind of programming (e.g., embedded Linux) or hardware design—or a combination of both. For instance, the controller 601 may be formed by a single processor, such as general purpose processor with the corresponding software implementing the described control operations. On the other hand, the controller 601 may be implemented by a specialized hardware, such as an ASIC (Application-Specific Integrated Circuit), an FPGA (Field-Programmable Gate Array), a DSP (Digital Signal Processor), or the like. The corresponding software is stored as computer-readable instructions (code, script, etc.) on a non-transitory computer readable medium (e.g., RAM, ROM, Flash Memory, hard-drive, etc.), the computer instructions being such that, when executed by the controller cause the controller to control the control system 600 to provide for the operation of the charging device as described herein.

The control system 600 is configured to obtain signals with at least one vision and/or localization sensor 602. The sensor 602 may be implemented as one of the sensors described throughout this disclosure. That is, the sensor 602 may be physically located, at the charging device or elsewhere in the charging system (including at the EV). In a preferred embodiment, the sensor 602 is located at the charging plug of the charging device.

The sensor 602 provides visualization and/or localization information about the charging system for use by the control system 600 to determine physical aspects of the charging system. For example, signals generated by the sensor 602 can be used by the controller 601 (alone or in combination with other elements of the control system 600) to determine a location, orientation, and/or status of at least one of: the charging plug, the arm, the EV, or the charging portal.

The sensor 602 may be embodied as a vision sensor, a proximity sensory, or any other sensor for sensing physical aspects of the charging system. For example, the sensor 602 may include at least one of: a camera (2D or 3D), a LiDAR sensor, an RFID sensor, a magnetic sensor, an ultrasonic sensor, a capacitive sensor, an inductive sensor, a light sensor, a flash camera sensor system, or the like.

In a preferred embodiment, the sensor 602 includes at least one camera, such as an RGB camera, a depth camera, or stereoscopic cameras. In a particularly preferred embodiment, the sensor 602 is a single camera located at the charging plug, in particular, a 2D camera at the charging head (e.g., at top, left, right, bottom of the charging head).

Additional sensors 603 may optionally be included within the control system 600. These additional sensors 603 may provide information to the control system 600 in conjunction with (or as a back-up to) information provided by the sensor 602, such information being used to determine visualization and/or localization information about components in the charging system. As such, the additional sensors 603 may include at least one of: a camera, a LiDAR sensor, an RFID sensor, an ultrasonic sensor, a capacitive sensor, an inductive sensor, a magnetic sensor, a light sensor, flash camera sensor system, or the like. In general, any sensor that can provide a signal that enables or enhances the control system's 600 ability to maneuver and orient the charging plug for easy and safe insertion into the charging port of an EV may be included in the control system 600.

In a preferred embodiment, the sensor 602 and additional sensors 603 form a flash-based photography sensing system. The flash-based photography system includes at least one vision sensor (e.g., a camera), a flash, and one or more tag(s) that are made of a hyper-reflective, omnidirectional material. In operation, the flash is cycled, which reflects light off of the tag(s), and the resulting image captured by the vision sensor essentially isolates only the tags. In other words, the reflection confuses the image except at the tag location(s), making the tag(s) easy to locate via image processing. The tags may be placed, for example, at the charging head and the charging portal.

The control system 600 is configured to drive motors 604 of the charging device. As used herein, motors include AC motors, DC motors, gear-driven motors, linear motors, actuators, or any other electrically controllable device used to effect the kinematics of the charging device. Accordingly, the control system 600 is configured to automatically and continually determine the physical state of the charging system, using the sensors 602, 603, and automatically control the various motors 604 of the charging device to maneuver and orient the arm, platform, cassette, charging plug, etc. to insert and retract the charging plug into the charging portal.

The control system 600 may further include a motor control unit (MCU) 606 (also referred to herein as a motor controller), e.g., as part of the controller 601 or a separate device. The MCU 606 controls motor drivers 607 using feedback from motor sensors 605 (e.g., encoders) in order to provide real time control of the motors 604. Accordingly, the MCU 607 receives instructions for controlling the motors 604 (e.g., receives motor/actuator control signals from the controller 601), and interprets those instructions, in conjunction with feedback signals from the motor sensors 605, to provide control signals to the motor drivers 607 for accurate and real-time control of the motors 604 (e.g., sends motor/actuator driver signals). The motor drivers 607 transform the control signals, as communicated by the MCU 606, into drive signals for driving the motors 604 (e.g., sends individual operation signals to the motors/actuators). In another embodiment, the MCU 606 is integrated with circuitry to directly control the motors 604.

The MCU 606 may be included as part of the controller 601 or a stand-alone processing system (e.g., a microprocessor). Accordingly, just like the controller 601, the MCU 606 is not constrained to any particular hardware, and the MCU's configuration may be implemented by any kind of programming or hardware design—or a combination of both.

The control system 600 may also include inferencing hardware 608, such as a machine learning accelerator. The inferencing hardware 608 may be included as part of the controller 601 (e.g., including as a software implementation) or as a stand-alone device. The inferencing hardware 608 may run a convolutional neural network (CNN). The inferencing hardware 608 may, therefore, implement machine learning to process the signals received from the sensor 602 (with or without signals from additional sensors 603) to make inferences about the physical aspects of the charging system. While this embodiment is described as implementing machine learning as a convolved neural network, other machine leaning algorithms may be used or none at all. For example, the control system may use a simpler control mechanism (e.g., vision based or dead-reckoning based, with proximity sensors) to determine relative locations/orientations of the charging plug and charging portal.

The CNN, according to an embodiment, is trained (e.g., trained previous to deployment) to infer positions/orientations/status of at least one of the distal end of the arm, the charging plug, or the charging portal from signals of the same type as captured by the sensor 602 (with or without additional signals from additional sensors 603). For example, the CNN may have been trained with a training data set having a set of image and/or video signal data and corresponding system position data (e.g., image/video and position data for arms, charging plugs, EVs, and charging portals). Such a CNN is, therefore, trained to infer positions or orientation of at least one of the distal end of the arm, the charging plug, or the charging portal from image/video data. The CNN may be further trained to infer at least one of: whether or not a vehicle is present; what type of vehicle is present; the status of the charging portal (e.g., open/closed); or whether the inlet is accessible. As should be recognized, systems other than a CNN may be employed to determine the same or similar scene perception/visualization to aid in the control of the charging device.

The control system 600 may include an input/output (I/O) terminal 609 for sending and receiving various input and output signals. For example, the control system may send/receive external communication to a user, a server (e.g., a billing server), a power unit, etc. via the I/O terminal 609. The control system 600 may further control the user feedback interface via the I/O terminal 609 (or otherwise).

The controller 601 may act as a central processing point to pull all the information together from the various subsystems of the control system (e.g., the sensors 602, 603, MCU 606, inferencing hardware 608, I/O 609; etc.) to provide a high level control of the system, which is executed by the subsystems.

In an embodiment, a non-transitory computer readable medium is provided that includes computer executable instructions for operating the charging device. The computer readable medium and computer executable instructions may be centrally located or distributed within the control system 600. For example, respective portions of the computer executable instructions corresponding to the configuration and operation of the controller 601, inferencing hardware 608, MCU 606, and/or the driver 607, may be respectively locally contained in a local non-transitory computer readable medium of the respective components of the control system 600.

According to an embodiment, the computer executable instructions, when executed by the control system 600 (e.g., collectively executed by the controller 601, inferencing hardware 608, MCU 606, and/or the driver 607), causes the control system to operate as follows:

The controller 601 receives a signal from the sensor 602 (and/or the additional sensors 603), determines control signals based on the signal, and sends the control signals to move the charging plug and to insert the charging plug into the charging portal. That is, the control signals contain instructions used to operate the motors to correctly move and position the charging plug to charge the EV. The sensor signal, according to an aspect of the present disclosure, can be a two-dimensional camera signal from a single camera attached at the charging plug.

More particularly, the controller 601 detects positions/states of at least one of the distal end of the arm, the charging plug, the charging portal, or the door of the charging portal based on the signal from the sensor 602 (with or without signals from the additional sensors 603). The controller 601 then determines (based at least in part on the detected positions/states) motor control signals, which are configured to (when executed) controllably operate motors to position and orient the arm within the working volume to a position where the charging portal is reachable by the charging plug. The controller 601 then sends those motor control signals to execute the specified movements. Here, the motors 604 include a plurality of motors collectively configured to (ultimately) position the distal end of the charging plug at all points within the working volume defined by a vertical axis, a longitudinal axis, and a lateral axis.

The controller 601 also determines (based at least in part on the detected positions/states) actuator control signals, which are configured to adjust the orientation and/or the position of the charging plug to align the charging plug with the charging portal. The controller 601 then sends those actuator control signals to execute the specified movements. The motors 604 include actuators specifically for fine-tuning the orientation/position of the charging plug, and the actuator control signals are directed at controlling such actuators.

The controller 601 further determines (based at least in part on the detected positions/states) further motor control signals, which are configured to operate the motors 604 to insert the charging plug into the charging portal. The controller 601 then sends those further motor control signals to execute the specified movements. Subsequently, e.g., after charging is completed, the controller 601 determines and sends additional motor control signals, which when executed, cause the motors 604 to retract the arm to its fully retracted state.

The controller 601 may be configured to continually receive the signals from the sensor 602 (with or without additional signals from the additional sensors 603) to continually determine the position/orientation/status of the physical environment of the charging system. The controller 601 may then continually determine/update its motor/actuator control signals based on the updated information on the physical environment. Further, while the above operations were explained as individual operations, it should be recognized that the operations can be executed in any order and/or simultaneously.

The motor controller 606 receives the motor/actuator control signals, and may further receive feedback signals. The feedback signals are provided by motor sensors 605 detecting the state/position of the various motors/actuators of the charging device. Based on the feedback signals and the motor/actuator signals, the motor controller determines motor driver signals and actuator driver signals. As such, the motor/actuator control signals may be high-level instructions for the operation (or resulting position) of the elements of the charging device, and the motor controller 606 may interpret those high-level instructions (as informed by the feedback signals) to provide lower-level control signals for individually driving the motors/actuators. The motor control unit sends the motor driver signals and actuator driver signals directly to at least one motor driver 607. In another embodiment, the motor control unit comprises circuitry capable of operating the appropriate voltage and currents for driving actuators coupled to its processing system (e.g., a microcontroller, FPGA, ASIC, etc.), and therefore, may send the motor driver signals and actuator driver directly to the motors 604.

In an embodiment including the motor driver 607, the motor driver 607 receives at least one of the motor driver signals or actuator driver signals, and generates an operation signal for at least one of the motors/actuators 604 that directly operates the motor/actuator 604 to perform the necessary movements to obtain the ultimate position/orientation desired to operate the charging system. The operation signal may be a device level signal for directly operating the particular motor/actuator 604 (e.g. a DC power signal or PWM control signal).

The control system 600 may execute the computer readable instructions to implement and operate a convolutional neural network (e.g., via the inferencing hardware 608). The convolutional neural network is trained to infer positions/states of at least one of: the EV, distal end of the arm, charging plug, or charging portal from image or video data. That is, the convolutional neural network receives image or video signal data from the sensor 602 (with or without additional signal data from the additional sensors 603) to make inferences about the physical environment of the charging system. The control system 600 (e.g., the controller 601 and inferencing hardware 608) using the convolutional neural network interprets the signal received from the sensor; and performs image recognition and/or image classification, or pose estimation based on the signal. In a preferred embodiment, the convolutional neural network performs a 5-6 degrees of freedom (DOF) pose estimation of the charging portal relative to the charging plug based on the signal. The convolutional neural network may then, based on the image recognition/classification and/or pose estimation, infer information about the physical environment. The inferred information about the physical environment is then used to determine the position/orientation/status of the physical environment of the charging system.

Figure 3:
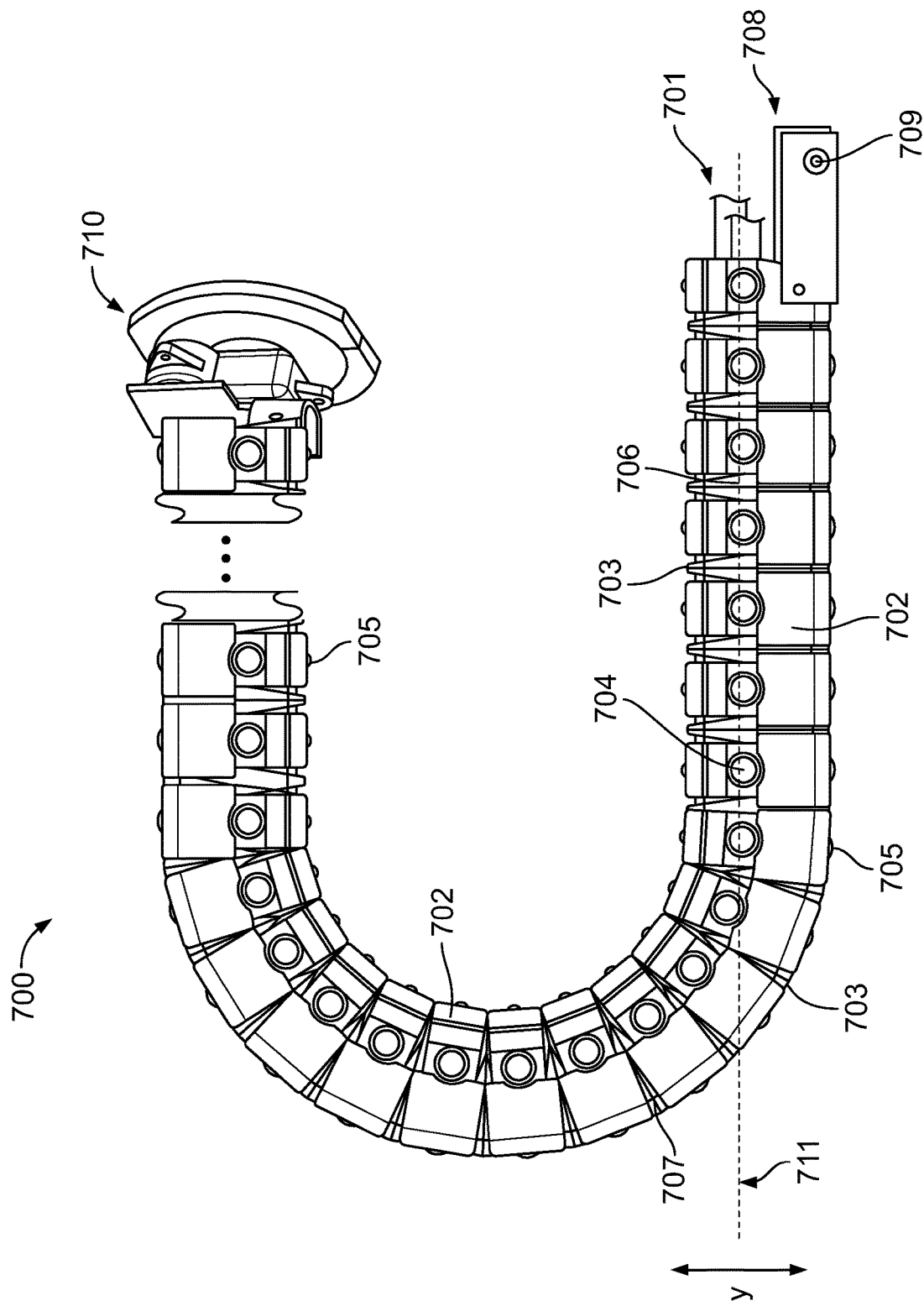
FIG. 3 illustrates an embodiment of an arm according to the present disclosure.

FIG. 3 illustrates an embodiment of an arm that is in the form of a rigid chain.

As described above, the arm of the charging device is extendible, retractable, collapsible, and capable of supporting a charging plug and accessories (e.g., cables and sensors). Also, in order to conserve space, the arm is preferably able to fold-upon itself to reduce the space required to contain the arm when it is stored within the main body of the charging device. A rigid chain, therefore, is a component of a preferred embodiment of the arm.

The rigid chain 700 is extendable and retractable, while also being able to be stored compactly. A characteristic feature of the rigid chain 700 is that it is capable of bending (compliant) in one direction from a neutral axis 711, yet it is stiff and cannot bend (resistant) in an opposite direction past the neutral axis 711. In the present embodiment, the rigid chain is oriented such that it cannot bend in the downward y-direction (i.e., the pull of gravity is in the direction where the rigid chain does not bend) past the neutral axis 711, but can bend upward. The present embodiment exploits these characteristics of the rigid chain 700 by folding the chain upon itself to provide compact storage, and using the rigidity of the rigid chain to extend toward the EV and support the charging plug. Accordingly, when in a fully retracted state, the rigid chain 700 is at least partially folded and contained within the housing of the main body.

The rigid chain 700 can be variously implemented, including with fully or partially enclosed conduit channels for guiding and protecting cables 701 (e.g., power cables, control cables, and accessory cables). For example, the rigid chain 700 may have a metal outside, which can be grounded for safety, and a plastic internal section for abrasion protection of the cables. Embodiments of the disclosed charging device can use a commercially available rigid chain (such as a Conduflex® rigid chain provided by Tsubaki, or similar), which advantageously contributes to the manufacturability and efficiency of the disclosed charging device.

The rigid chain 700 is made of a plurality of links 702, 703, which are moveably interconnected. In the present embodiment, the rigid chain includes two types of links 702, 703, which are alternatingly connected at a rivet joint 704. The joint allows relative rotational movement between the adjacent first link 702 and second link 703.

The rotational movement between adjacent links 702, 703 is limited by the geometry of the two types of links 702, 703. Accordingly, the rotational movement is limited in the downward direction such that adjacent links 702, 703 are rigidly held in an essentially parallel aligned orientation (i.e., to provide an essentially straight conduit). The rotational movement is limited in the upward direction to provide a maximum bend radius of the rigid chain 700.

The various links 702, 703 are independently moveable, which allows for a portion of the rigid chain 700 to be rigid and straight, while other portions may be bend (to varying degrees). According to an embodiment, the link may be heavy-duty metallic, in particular when the weight of the plug and accessories (e.g., cabling and sensors) is great.

The first link type 702 has a first shape that differs from the shape of the second link type 703. However, each one of the links of the first link type 702 has the same shape, similarly each one of the links of the second link type 703 has the same shape.

In the present embodiment, the first link type 702 has an essentially T-shaped profile, when viewed from the side, with ridges 705 at the top and bottom. When viewed from the front, the first link type 702 has an essentially rectangular cross section. The first link type 702 may be made of metal, and may be an external link.

The second link type 703, of the present embodiment, is shaped such that it at least partially inserts into its adjacent links of the first link type 702. Accordingly, each link of the second link type 703 has one side inserted into a first link of the first link type 702 and moveably attached therein to a first rivet joint 704, and has an opposite side inserted into a second link of the first link type 702 and moveably attached therein to a second rivet joint 704. The second link type 703 may be made of plastic or fiber class impregnated nylon, for example.

Further, the second link type 703 is configured such that, when the adjacent first and/or second link of the first link type 703 moves, that adjacent link moves over the top of the second link type 703, until it abuts a stop 706, 707. A top side of the second link type 703 has a first stop 706 that is a protrusion having an essentially triangular shape (or wedged shaped). The angle of a side of the triangular shape limiting the maximum angle of the bend. A bottom side of the second link type 703 has a second stop 707, which is essentially a protruding ridge. The second stop 707 limits the movement of the adjacent links from substantially bending in the downward direction past the neutral axis 711.

A connecting link 708 is provided at an originating end of the rigid chain 700, which terminates in the main body (i.e., the originating side). The connecting link 708 positions the rigid chain within the main body such that it maintains an appropriate position (e.g., such that it does not bind or fowl the cabling). In one embodiment, the connecting link 708 is fixed (i.e., a fixed anchor point) within the main body at a terminal side of a rigid chain guide. In another embodiment, the connecting link 708 is attached via a shaft 709, allowing the connecting link 708 to pivot (i.e., a rotating anchor point for the rigid chain 700). The pivotable connecting link 708 has the advantage of enabling a greater extension of the rigid chain over that of the fixed connecting link 708 for the same overall length. Also, the pivotable connecting link 708 has the advantage of requiring a reduced overall height of the main body. That is, the rigid chain requires less space within the main body, when using a pivotable connecting link 708. An advantage of embodiments using an anchor point (fixed or rotating) is that the amount of excess cabling (i.e., cabling not held within the conduit of the rigid chain) is reduced and the cabling does not need to move within the housing of the main body.

The connecting link 708, however, need to be held at an anchor point. Instead, the connecting link 708 may communicate with a channel of the rigid chain guide, and move within the channel. In this way, the rigid chain maintains a movement path within the housing. The advantage of having an unanchored end of the rigid chain is that the rigid chain can take up less space within the housing; however, a greater excess length of cabling is required in this embodiment (e.g., service loops).

The connecting link 708 preferably is open at the top to effectively increase the allowable cable bend radius (i.e., increased over a closed top embodiment).

An end-mount 710 is attached to the distal end of the rigid chain 700. The end-mount 710 being for mounting the charging plug with or without a tilting platform.

Figure 4:
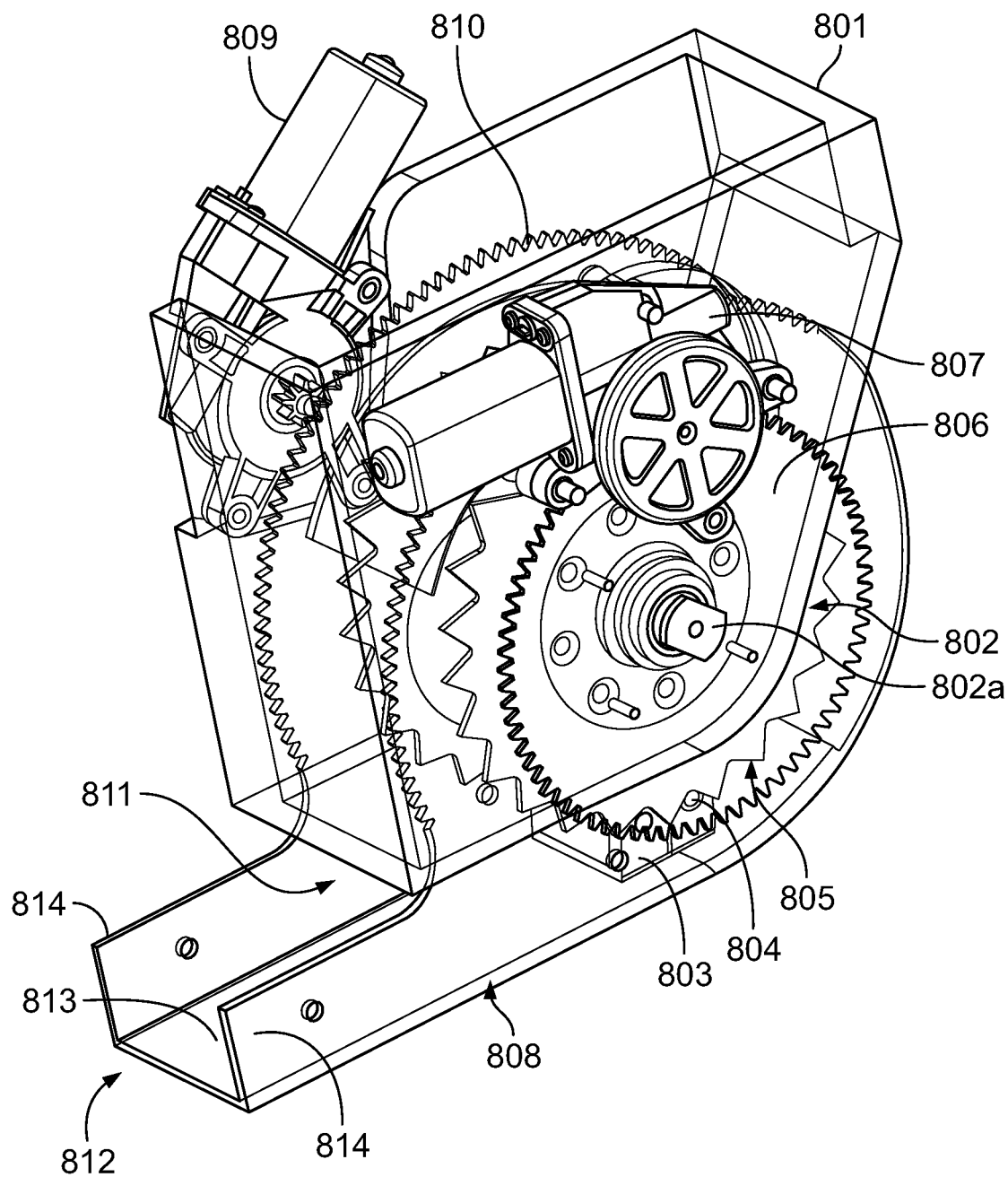
FIG. 4 illustrates an embodiment of a cassette of a charging device according to the present disclosure.

FIG. 4 illustrates an embodiment of a cassette for feeding a rigid chain.

The cassette 800 may be used in any embodiment of the charging device of the disclosure configured to use a rigid chain as the arm. Accordingly, the cassette 800 is configured to controllably extend and retract the rigid chain.

The cassette 800 has a main bracket 801 to which the other cassette components are mounted. The main bracket 801 is configured to be attached within or to the main body of a charging device.

A gear wheel 802 is rotatably mounted to the main bracket 801. For example, a shaft 802a of the gear wheel 802 may be attached to the main bracket 801 (e.g., rotatably attached via a bearing). As such, the gear wheel 802 is able to freely rotate about its shaft 802a (i.e., around the gear wheel axis).

The gear wheel 802 is configured to engage with links 803 of the rigid chain (two links are shown for the sake of clarity). The cassette 800 is configured to rotate the gear wheel 802 in a clockwise direction to extend the rigid chain, and to rotate the gear wheel 802 in a counter clockwise direction to retract the rigid chain. To this end, valleys between the teeth 805 of the gear wheel 802 are configured to engage with the rivets 804 of the links 803 of the rigid chain, which allows the links 803 to register at the gear wheel 802, maintaining an even and controllable feed of the rigid chain. Accordingly, the rigid chain is driven (at least in part) by the rivets 804 meshing with the teeth 805.

The gear wheel 802 is attached to a driving gear 806, which is controllably driven by a motor 807. As described above, the motor 807 is automatically controllable by a control system. Further, the motor 807 and/or the driving gear 806 may have a motor sensor (e.g., a hall sensor or an encoder) for feedback control of the motor. Accordingly, the charging device is configured to controllably turn the gear wheel 802 to extend and retract the rigid chain.

The gear wheel 802 may be driven by a single driving gear 806 and motor 807 on one of its sides. However, cassettes of the present disclosure are not so limited. For example, a gear wheel 802 may be coupled to a second driving gear 806 and a second motor 807 or idler pulley, which can eliminate (or reduce) unwanted forces acting on the gear wheel. Alternative driving arrangements are also contemplated by the disclosure, including using a direct drive motor as the gear wheel 802 itself. The driving gear may be mounted on the shaft 802a.

The gear wheel 802 is in the shape of a spool (or otherwise resembles a pulley). The central, smaller-diameter cylinder of the spool is sized to correspond to a major width of the links 803 of the rigid chain. Each of the disk-shaped sides (first and second side disks) of the spool, have a larger diameter than the middle cylinder and have a gear profile about their circumference, including teeth 805. The disk-shaped sides extend over the sides of the link 803 and are spaced such that the teeth 805 can engage with the rivet 804 (e.g., the sides cover at least a portion of the sides of the links 803, excluding the rivets 804, which project past an inner surface of the sides). Valleys may indent into the central cylinder of the gear wheel 802 to communicate with ridges in the top of the links 803.

The cassette 800 also includes a feeding chute 808. The feeding chute 808 is configured to receive the links 803 from the rigid chain stored within the housing to maintain communication between the links 803 and the gear wheel 802 and to direct the feeding exit of the rigid chain outside of the main body of the charging device. That is, the feeding chute is sized and positioned such that the links 803 maintain communication with the gear wheel 802 and the feeding shaft 808 to enable the driving force to efficiently act of the links 803 to extend and retract the rigid chain.

For example, the feeding chute 808 may have first and second side walls 814 and a base 813 that form a channel 811 to guide the links 803 of the rigid chain. An exit side of the channel 811 forms a feed point 812 that directs the exit of the rigid chain from the main body of the charging device. The feeding chute 808 can be configured to provide relief support to the rigid chain by attaching a telescoping support tray (e.g., a tray attached to the feeding chute via slides).

The base 813 of the feeding chute 808 is dimensioned and arranged with respect to the gear wheel 802 and the links 803 of the rigid chain to force links 803 of the rigid chain into contact with the gear wheel 802. The feeding chute 808 at least partially surrounds the gear wheel 802. For example, the side walls 814 may cover opposite sides of the gear wheel 802, and the base 813 may cover a bottom side of the gear wheel 802.

The feeding chute 808 can also be rotatably mounted in the main bracket 801. In particular, the feeding chute 808 may be mounted on the shaft 802a (i.e., independently rotatable about the gear wheel axis). The feeding chute 808 can be controllably rotated in order to adjust the feeding angle of the rigid chain as it exits the main body of the charging device. To this end, the feeding chute 808 has a curved gear profile in mechanical communication with a driving gear of the motor 809

For example, a gear profile including gear teeth 810 can be cut in at least one of the side walls 814. The gear teeth 810 are driven by a motor 809. As described above, the motor

809 may be automatically controlled by the control system. Advantageously, the sides of the feeding chute 808 may have the same shape for efficient manufacturability. That is, each of the first and second side walls 814 may have a gear profile cut into a portion thereof.

The feeding chute 808 may be driven by a single motor 809 on one of its sides. However, cassettes of the present disclosure are not so limited. For example, the feeding chute may be coupled to a second motor 809 or idler gear, which can eliminate (or reduce) unwanted forces acting on the feeding chute 808. That is, a first feeding chute motor 809 may be in mechanical communication with the gear profile portion of the first side wall 814, and either a second feeding chute motor 809 or an idler gear may be in mechanical communication with the gear profile portion of the second side wall 814.

Figure 5A:
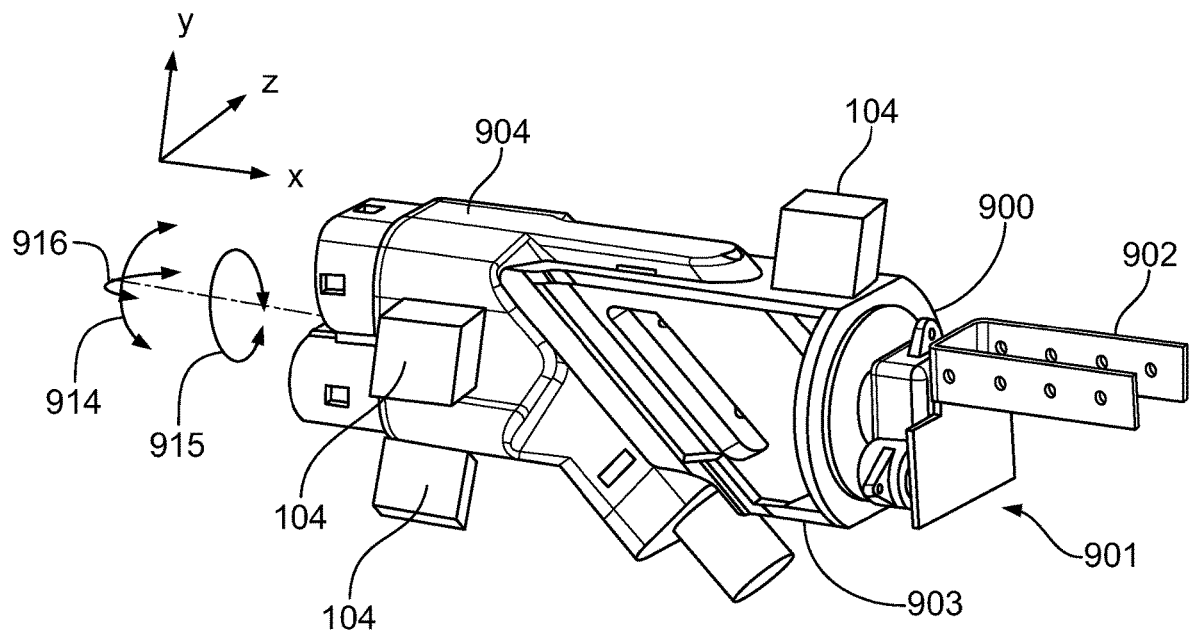
FIGS. 5A-5C illustrate embodiments of a charging plug and platform subassembly for a charging device according to the present disclosure.
Figure 5B:
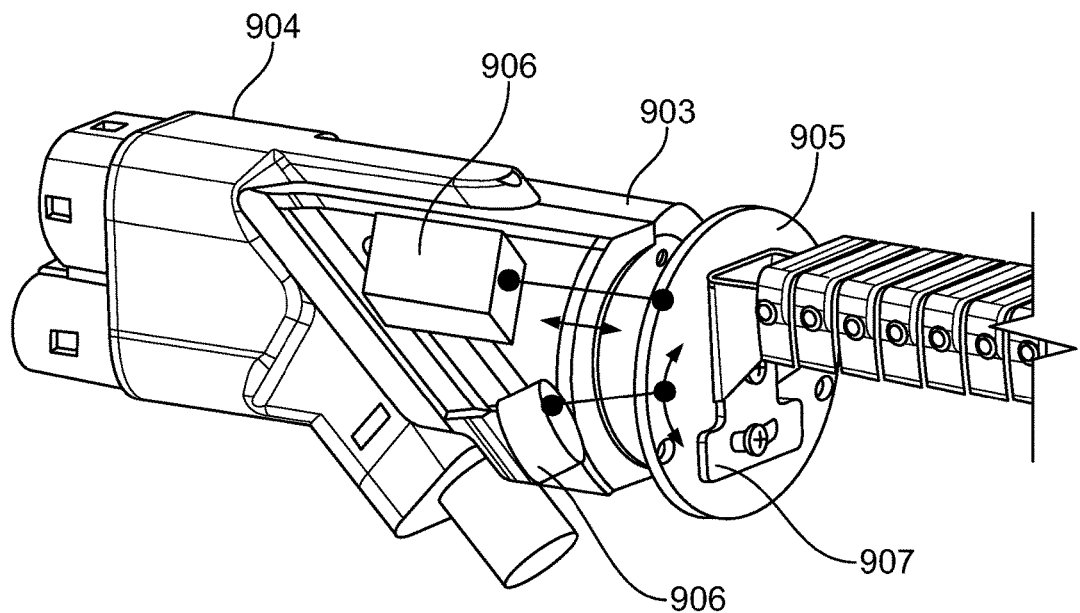
Figure 5C:
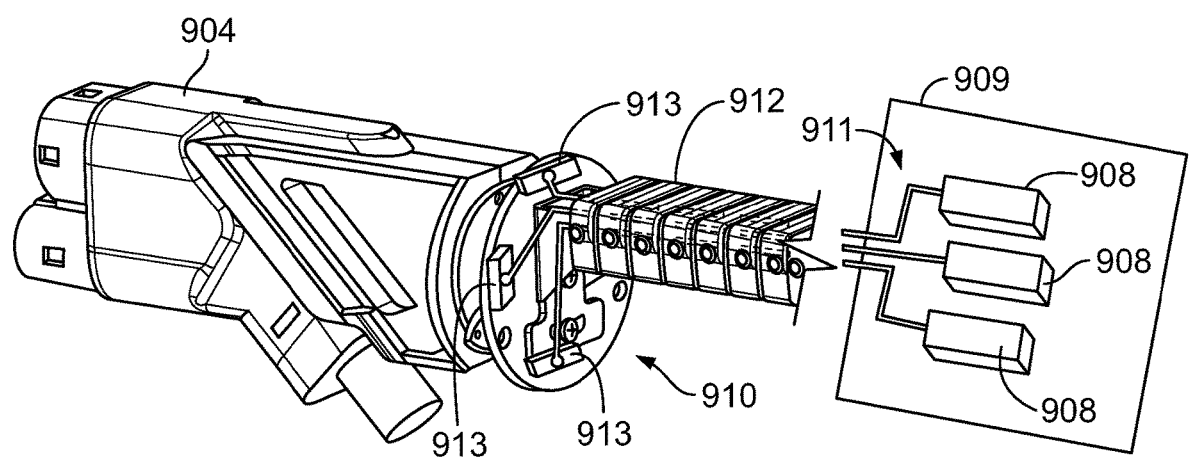

FIGS. 5A-5C illustrate embodiments of a charging plug and platform subassembly.

The charging plug is attached to the arm of the charging device via the platform, the platform being controllably moveable to orient and/or position the charging plug (e.g., angle up/down and tilt side-to-side). The charging plug and platform assembly can be implemented in multiple different variations, such as those described in connection with FIGS. 5A-5C. Other variations are, of course, within the scope of the present disclosure.

In the embodiment of FIG. 5A, an independent tilting unit 900 is provided as part of the tilting platform 901 with its own actuators (or other controllable positioning devices) to provide the tilting movements. For example, the tilting unit 900 can provide two or three degrees of freedom (e.g., pitch 914 at the y-axis, roll 915 about x-axis, and/or tilt 916 across the z-axis) in response to receiving operation signals from the control system. In a preferred embodiment, the titling unit has two degrees of freedom (e.g., pitch 914 at the y-axis and roll 915 about x-axis, or pitch 914 at the y-axis and tilt 916 across the z-axis).

The platform 901 is attachable on one side to the arm of the charging device via a bracket 902. The other end of the platform 901 attaches to a holder 903, which couples the charging plug 904 to the platform 901. One or more sensors 104 may be attached at any of the sides of the plug head of the charging plug 904 or the plug head holder 903. That is, at least one of the sensors 104 can be attached adjacent to the plug head to give a plug head-view of the environment of the charging system.

The charging plug holder 903 may be configured as a reversible mount, which is removable from the platform 901 and/or the charging plug 904 without tools. For example, the charging plug holder 903 may mount the charging plug 904 via a magnetic closure, a knob/thumb screw connector, or snap shut. The holder 903 can register the charging plug 904 to the cords of the charging device. The charging plug holder 903 enables the charging plug 904 to be easily detached when power is off.

In the embodiment of FIG. 5B, actuators 906 are included at the holder 903 (or charging plug). The actuators 906 interface with the platform 905 to provide the tilting movements (e.g., pitch at the y-axis and roll about the x-axis, or pitch at the y-axis and tilt across the z-axis). The actuators 906 are controllable via operation signals received from the control system.

In an embodiment of FIG. 5C, cables 911 are coupled to the platform 910, and run through the arm 912 to couple to actuators 908 contained within the main body 909 of the charging device. The actuators 908 can then move the cables to tilt the platform 910 to effectuate movement of the charging plug 904 (e.g., pitch at the y-axis and roll about the x-axis, or pitch at the y-axis and tilt across the z-axis). The actuators 908 can be controllably operated according to operation signals received from the control system. The cable-actuator embodiment has the added advantage of providing a weight reduction at the cantilevered end of the arm 912 and is cost-effective.

The cables 911 may be implemented as Bowden cables. The Bowden cables transmit a push/pull force imparted by the actuators 908 to effectors 913, which are coupled to the platform 910. The effectors 913 convert the linear push/pull forces transmitted via the Bowden cables into the tilting forces to tilt (e.g., pitch, yaw, and/or roll) the platform 910.

In another embodiment, the cables 911 may be replaced with hydraulic lines, the mechanical effectors 913 may be replaced with hydraulic actuators, and the actuators 908 may be replaced by hydraulic control valves. The hydraulic control valves may be controllably operated via operation signals received from the control system to increase/decrease hydraulic pressure in the hydraulic lines to control the hydraulic actuators to tilt the platform. The advantage of the hydraulic embodiment is that it allows for enhanced precision and decreased control complexity.

Accordingly, the titling platform, regardless of the implemented form, provides angulation at the charging plug for fined-tuned alignment of the plug head with the charging portal of the EV. Angulation may enable a more effective and easier to use charging device because it allows for imperfect alignment of the EV (and its charging portal) with the charging device. For example, embodiments of the charging system may allow for a vehicle stationed at +/−15° off of perpendicular to a front face of the charging device. Accordingly, a preferred embodiment of the tilting platform provides a tilt up and down (pitch at the y-axis) of +/−45°, and particularly preferably of +5° and −45°. Also, a preferred embodiment of the tiling platform provides at least one of a side-to-side (lateral at z-axis) or rotational (about the x-axis) movement of +/−45°, and particularly preferably of +/−20°.

Figure 6:
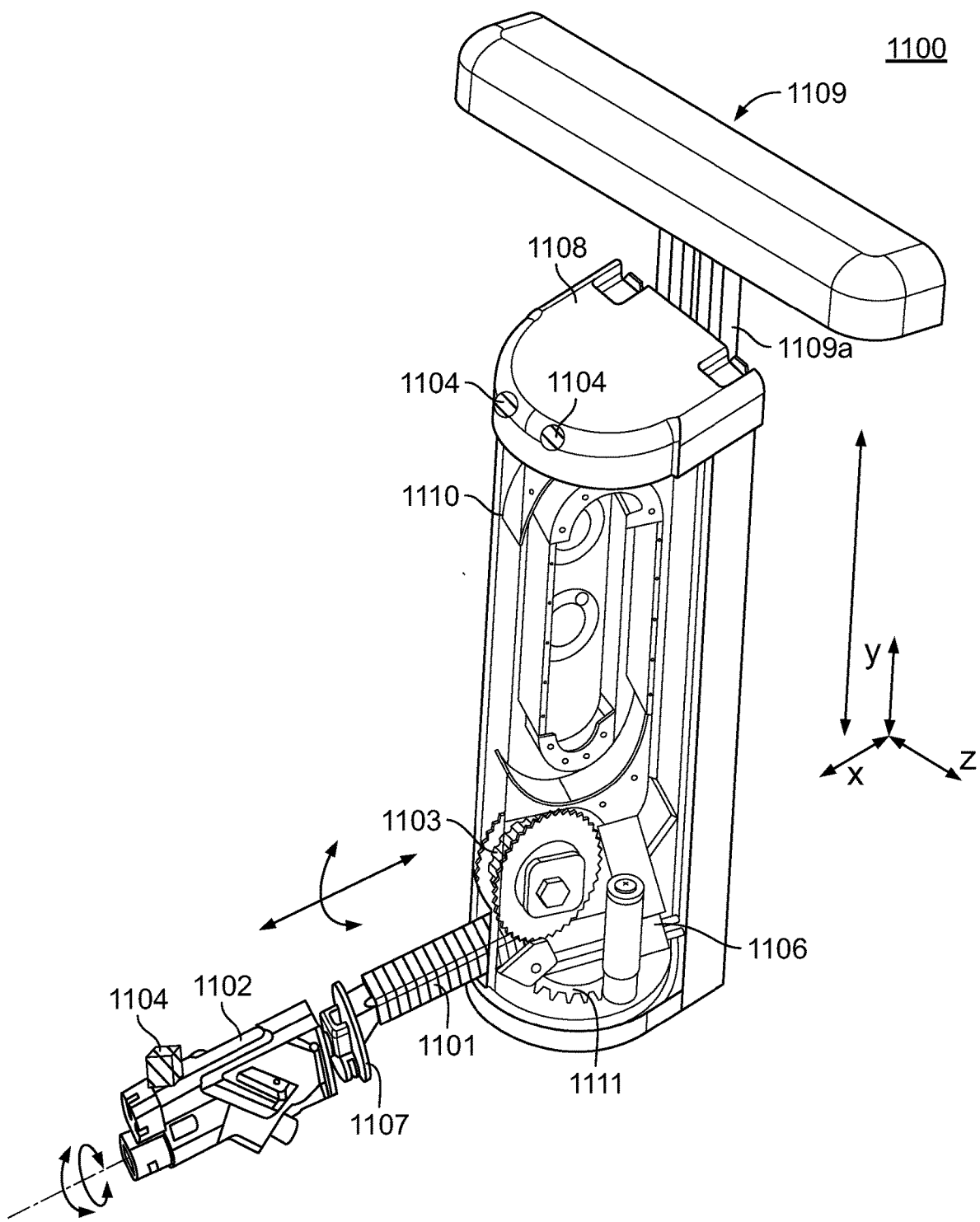
FIG. 6 depicts an embodiment of a charging device according to the present disclosure.

FIG. 6 depicts another embodiment of a charging device according to the present disclosure.

The charging device 1100 operates similarly to the charging devices described elsewhere herein to provide automated charging of EVs, however, the charging device 1100 has a differing kinematic system as compared to other charging devices described herein (in at least some respects). Unless otherwise specified, it should be understood that the charging device 1100 is configured/operates similarly to the charging devices described elsewhere herein. Moreover, as a skilled artisan would readily appreciate, aspects of the present embodiment may be incorporated (directly or with simple modification) into other embodiments, and vice versa, without departing from the scope of the present disclosure.

The charging device 1100 uses a rigid chain 1101 as its arm. The rigid chain 1101 is coiled within the main body 1108 to conserve vertical height of the overall packaging of the charging device 1100 (rigid chain partially shown for ease of understanding). For example, in the embodiment shown in FIG. 6, the rigid chain 1101 is configured to fold-upon itself in two loops, and is guided within the main body 1108 by a guide 1110. In this embodiment, the rigid chain 1101 has its connecting link captured within a channel (i.e., the rigid chain does not have a singular anchor point).

The charging device 1100 uses a cassette 1103 to drive its rigid chain 1101. The cassette 1103 of the present embodiment does not include a rotatable chute. As such, it may only extend the rigid chain 1101 longitudinally (i.e., in linear x-direction movement). However, because sub-systems are modular within the scope of the disclosure, a cassette with a rotatable chute may alternatively be used.

The charging device 1100 itself, however, can move vertically via a vertical drive mount 1109 (i.e., linear y-direction movement). The vertical dive mount may use linear controllable motors, linear actuators, a chain drive, etc. to move the main body of the charging device 1100 vertically.

A motor 1111 (e.g., a gear motor) may be included in the base to enable rotational movement (e.g., rotational z-direction movement). For example, the main body may be mounted on a rotary stage 1112 on stub shafts to provide one degree of freedom (1DOF), in particular rotational movement. The motor 1111 is controllable by the control system based on signals received from the sensors 1104. In a preferred embodiment, the rotary stage 1112 provides a movement of +/−90° (i.e., a 180° rotation). A thrust bearing may be included to provide radial support of the main body.

A linear support arm 1106 is controllably extendable to provide support relief for the rigid chain 1101. The linear support arm 1106, may be an extendible ram (e.g., via a linear actuator or hydraulic ram) that slides under the rigid chain, with a support end configured to cradle the bottom of the rigid chain 1101. When in a retracted state, the linear support arm 1106 may be essentially stored within the housing of the main body 1108. In an extended state, the linear support arm 1106, extends its cradle to a point beyond the main body to provide a point for supporting the weight of the control arm as it extends from the main body. The linear support arm 1106 may be controllably extended via the control system to move/retract with the rigid chain.

Figure 7:
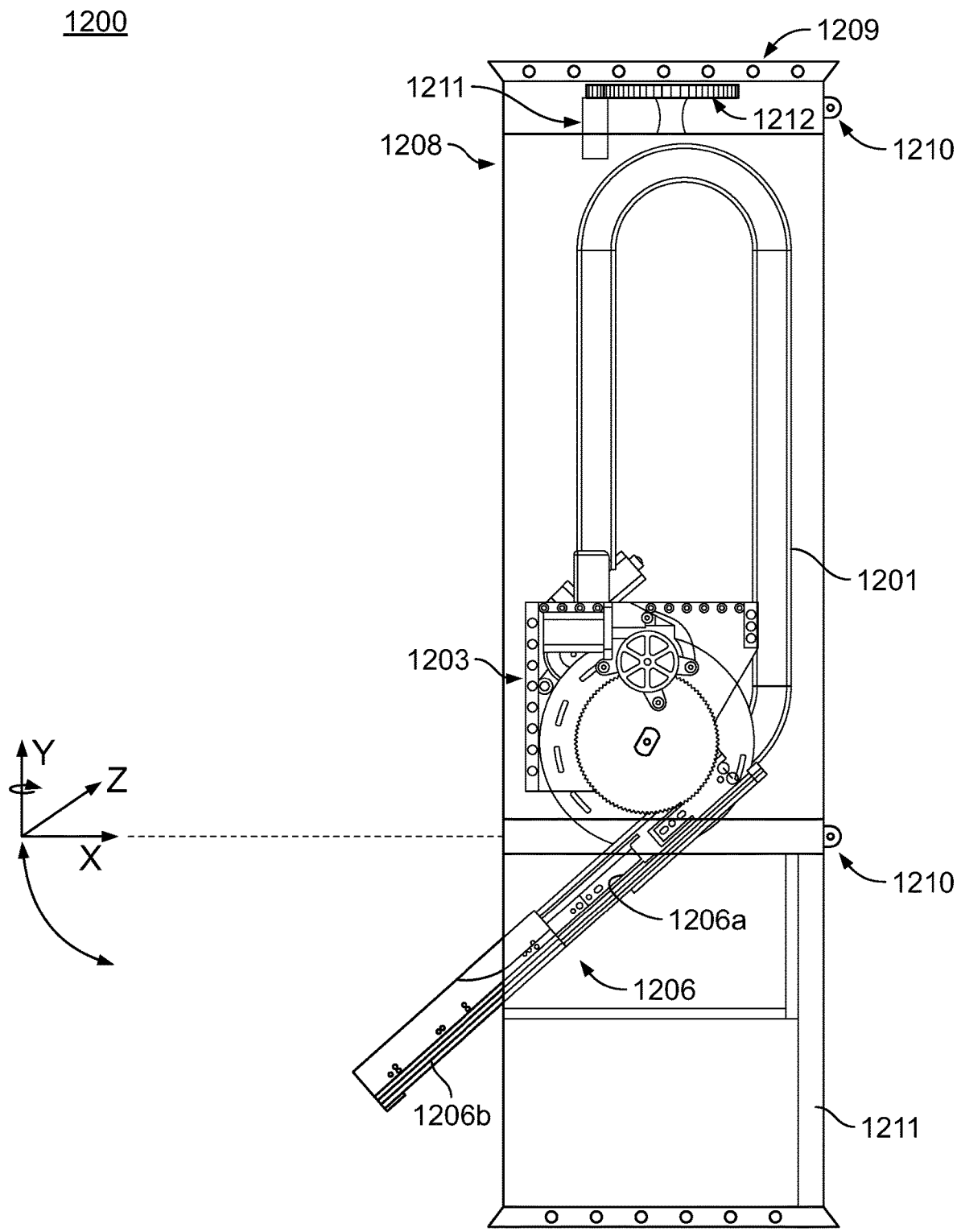
FIG. 7 depicts another embodiment of a charging device according to the present disclosure.

FIG. 7 depicts another embodiment of a charging device according to the present disclosure.

The charging device 1200 operates similarly to the charging devices described elsewhere herein to provide automated charging of EVs, however, the charging device 1200 has a differing kinematic system as compared to other charging devices described herein (in at least some respects). Unless otherwise specified, it should be understood that the charging device 1200 is configured/operates similarly to the charging devices described elsewhere herein. Moreover, as a skilled artisan would readily appreciate, aspects of the present embodiment may be incorporated (directly or with simple modification) into other embodiments, and vice versa, without departing from the scope of the present disclosure.

The charging device 1200 includes an arm 1201 (e.g., provided as a rigid chain), a cassette 1203 (configured to feed/retract the arm 1201), and a support tray 1206.

The support tray 1206 is attached to the cassette 1203 (e.g., at the feeding chute). The support tray includes sliding drawers 1206a provided on each side of the exit of the cassette (e.g., one sliding drawer 1206a attached to the first side wall and another sliding drawer 1206a attached to the second side wall of the feeding chute). A support 1206b is provided at a distal end of the sliding drawers 1206a. The support is dimensioned to cradle a bottom part of the arm 1201 as it extends away from the main body 1208.

The sliding drawers are configured to extend with the arm and retract as the distal end of the arm 1201 retracts back toward the main body 1208 (e.g., via a spring force). In this way, the sliding drawers 1206a extend the support 1206b to various points away from the main body 1208 up to a maximum point (as determined by the length of the sliding drawers 1206a).

The charging device 1200 is configured to be mounted with the exit point of the cassette 1203 at a point level with or higher than the highest expected position of the charging portal of an EV (from ground). The charging device 1200 may be mounted from above via a bracket 1209 (e.g., directly to a ceiling or from a column extending down from the ceiling. The charging device 1200 may also be mounted to a wall or pole via rear mounting brackets 1210. The charging device 1200 may also be fitted with a mounting pedestal 1211 configured to mount the charging device 1200 to the floor (with or without an extension base/pedestal).

The cassette 1203 of the charging device may include a controllably tiltable (e.g., rotating y-direction movement) feeding chute. In the present embodiment, the movement may be configured to range from 0 to −45° from horizontal.

A motor 1211 (e.g., a gear motor) may be included at the top of the main body 1208 to enable rotational movement (e.g., rotational z-direction movement). For example, the main body 1208 may be mounted on a rotary stage 1212 on stub shafts to provide one degree of freedom (1DOF), in particular rotational movement. The motor 1211 is controllable by the control system.

Figure 8:
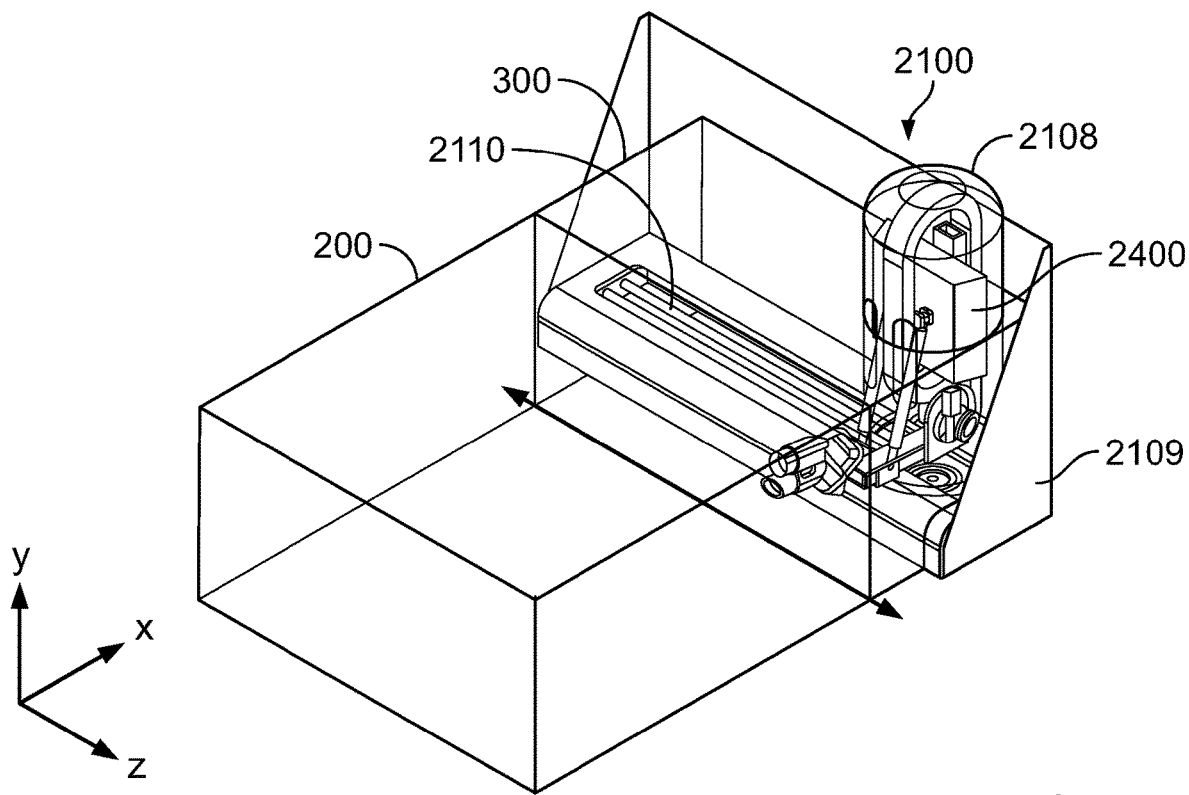
FIG. 8 depicts another embodiment of a charging system according to the present disclosure.

FIG. 8 depicts another embodiment of a charging system according to the present disclosure.

The charging system 20 operates similarly to the charging system described elsewhere herein to provide automated charging of EVs, however, the charging system 20 has a differing kinematic system as compared to other charging systems described herein (in at least some respects) and has a differing arrangement of system components. Unless otherwise specified, it should be understood that the charging system 20 is configured/operates similarly to the charging system described elsewhere herein. Moreover, as a skilled artisan would readily appreciate, aspects of the present embodiment may be incorporated (directly or with simple modification) into other embodiments, and vice versa, without departing from the scope of the present disclosure.

The charging system 20 includes a charging device 2100 that incorporates the power supply 2400 within its main body 2108. The power supply may be in accordance with EVSE (electrical vehicle supply equipment) standard as known in the art.

The main body 2108 of the charging device 2100 is mounted on a translational base 2109 to provide side-to-side movement (i.e., lateral z-direction movement) of the main body 2108, which effectively controls the side-to-side positioning of the charging plug within the working volume 200. To effect the side-to-side movement, the translational base 2109 may include a track/guide 2110, via which the main body 2108 can be controllably moved by the control system. A motor may be provided in the main body 2018 to mechanically communicate with the track/guide 2110 to effect the side-to-side movement. Alternatively, linear motors may be incorporated into the translational base 2019 to couple between the main body 2109 and the track/guide 2110. The translational base 2109, may be attached to a wall or other structure.

As with other embodiments, the charging device's arm is extendable laterally in the longitudinal direction (x-direction) and tillable in the vertical direction (rotational y-direction movement). Collectively, the movement of the arm and the base allows the arm to extend the charging plug to every point within the working volume 200.

Figure 9:
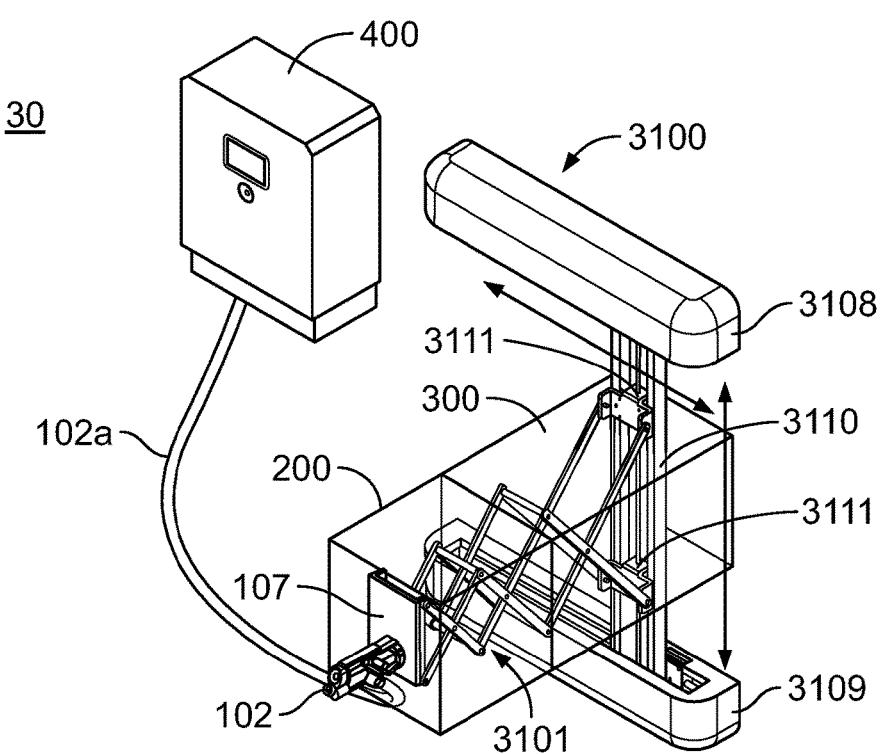
FIG. 9 depicts a further embodiment of a charging system according to the present disclosure.

FIG. 9 depicts another embodiment of a charging system according to the present disclosure.

The charging system 30 operates similarly to the charging system described elsewhere herein to provide automated charging of EVs, however, the charging system 30 has a differing kinematic system as compared to other charging systems described herein (in at least some respects) and has a differing form of some of the of system components. Unless otherwise specified, it should be understood that the charging system 30 is configured/operates similarly to the charging system 30 described elsewhere herein. Moreover, as a skilled artisan would readily appreciate, aspects of the present embodiment may be incorporated (directly or with simple modification) into other embodiments, and vice versa, without departing from the scope of the present disclosure.

The charging system 30 includes a charging device 3100 and a power supply 400.

The charging device 3100 has its extendible/retractable arm 3101 provided in the form of a scissor arm. The scissor arm includes at least two supports linked at a mid-point by a pivoting joint. The present embodiment, includes a parallel set of linked supports for enhanced strength and rigidity. The scissor arm can include multiple stages of linked supports. For example, the depicted arm 3101 has three parallel stages of linked supports.

The arm 3101 is laterally extendable (i.e., linear z-direction movement). Extension/retraction is achieved by applying a force to the set of supports located at the originating end of the arm 3101. In the charging device 3100, the force is applied by linear motors 3111. The linear motors 3111 are controlled by the control system of the charging device.

Upper and lower bases 3108, 3109 are provided as part of the charging device 3100. The upper and lower bases 3108, 3109 include the electronics for operating the charging device 3100. The upper and lower bases 3108, 3109 may attach to a wall to mount the charging device 3100. A central track 3110 is coupled between the upper and lower bases 3108, 3109. The originating end of the arm 3101 is moveably coupled to the track 3110, the linear motors 3111 are also moveably coupled to the track 3110. The track 3110 and linear motors 3111, in addition to enabling the extension/retraction of the arm, also enable vertical movement of the arm (i.e., linear y-direction movement).

The upper and lower bases 3108, 3109 may further include a translational drive mechanism (e.g., a chain drive or linear motor system) for lateral movement of the track 3110, which in turn, effects a lateral movement of the arm 3101.

Collectively, via the extension of the scissor arm 3101 and the lateral/vertical movement of the arm via the track 3110 and translational base movement, the arm 3101 can controllably extend the charging plug 102 to all points of the working volume 200. The charging plug 102 is coupled to a charging cable 102a, which is coupled to the power supply 400. The charging cable 102a, may directly connect the charging plug to the power supply 400 as in the present embodiment, or the charging cable 102a may be first guided within a conduit associated with the arm to a base of the charging device, and then routed to the power supply 400.

A platform 107 may be attached to the arm 3101 to attach the charging plug 102 to the arm 3101. The platform 107 controllably provides a tilting movement of the charging plug 102.

While the charging device 3100 has been described in connection with a scissor arm configuration, a main body of a charging device housing a rigid chain and rigid chain cassette may instead be mounted on the track 3110. In this way, the main body may be controllably moved in linear lateral and vertical directions.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. For example, the various embodiments of the kinematic, control, electrical, mounting, and user interface subsystems can be used interchangeably without departing from the scope of the invention. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A charging device for autonomously charging an electric vehicle, the charging device comprising:
    a main body, which is controllably moveable in at least one of a rotational, vertical, or lateral direction;
    an arm coupled to the main body, which is controllably extendable and retractable in a longitudinal direction;
    a charging plug at a distal end of the arm, the charging plug configured to be controllably moveable and insertable into a charging portal of the electric vehicle,
    wherein the arm comprises:
        a rigid chain, the rigid chain being compliant in a first direction from a neutral axis and resistant in an opposite second direction past the neutral axis, or
        at least one scissor arm.

2. The charging device according to claim 1, the charging device comprising a cassette, which is configured to controllably extend and retract the rigid chain, wherein the cassette comprises:
    a main bracket connected to the main body within the housing;
    a gear wheel rotatably mounted in the main bracket, the gear wheel being controllably rotatable about a gear wheel axis; and
    a feeding chute at least partially surrounding the gear wheel, the feeding chute having a first side wall, a second side wall, and a base,
    wherein the first side wall, the second side wall, and the base form a channel to guide the rigid chain, an exit side of the channel forming a feed point that is configured to direct an exit of the rigid chain from the main body,
    wherein the feeding chute is configured such that the base holds a portion of the rigid chain in communication with the gear wheel, and
    wherein the arm comprises the rigid chain.

3. The charging device according to claim 2, wherein the cassette comprises:
   a gear wheel motor connected to the main bracket; and
   a driving gear concentrically connected to the gear wheel, the driving gear being in mechanical communication with the gear wheel motor, the driving gear being configured to be reversibly driven by the gear wheel motor to controllably rotate the gear wheel to feed and retract the rigid chain to effect a longitudinal position of the charging plug at the distal end of the arm.

4. The charging device according to claim 2,
   wherein the cassette comprises a feeding chute motor,
   wherein at least one of the first side wall or the second side wall of the feeding chute has a curved gear profile portion in mechanical communication with the feeding chute motor,
   wherein the feeding chute is rotatably mounted to the main bracket, and
   wherein the feeding chute motor is configured to controllably rotate the feeding chute to adjust the position of the feeding point to effect a vertical positioning of the charging plug at the distal end of the arm.

5. The charging device according to claim 3,
   wherein the first side wall and the second side wall have a same profile,
   wherein the feeding chute motor is in mechanical communication with the gear profile portion of the first side wall, and
   wherein either a second feeding chute motor or an idler gear is in mechanical communication with the gear profile portion of the second side wall.

6. The charging device according to claim 2,
   wherein the gear wheel has a spool shape, having a central cylinder of a first diameter, and a first side disc and a second side disc on each side of the central cylinder, each having a second diameter larger than the first diameter,
   wherein a width of the central cylinder corresponds to a major width of a link of the rigid chain,
   wherein the first side disk and the second side disk each have a gear profile, valleys of the gear profile being configured to mechanically communicate with rivets of the link, and
   wherein the first side disk and the second side disk are configured to cover at least a portion of sides of the link.

7. The charging device according to claim 2, the charging device comprising a support tray attached to the cassette, the support tray configured to extend with the rigid chain to provide relief support of the rigid chain at a point away from the main body, the support tray comprising a spring configured to provide an extending force.

8. The charging device according to claim 1, the charging device comprising an arm support configured to provide relief support of the arm at a point away from the main body, the arm support configured to extend longitudinally as the arm is extended and retract as the arm retracts.

9. The charging device according to claim 1, wherein the arm comprises the rigid chain and wherein a guide is arranged within a housing of the main body, the guide being configured to guide the rigid chain to fold upon itself for compact storage.

10. The charging device according to claim 1, wherein the arm comprises the rigid chain and comprises a connecting link attached to an originating end of the rigid chain, the connecting link coupling the rigid chain to the main body, and the connecting link having an open top configured to provide clearance for cable bend.

11. The charging device according to claim 10, wherein the connecting link is rotatably coupled to the main body such that the connecting link is pivotable around an anchor point.

12. The charging device according to claim 1, wherein the charging plug is attached to the arm via a platform, the platform being controllably moveable to orient or position the charging plug.

13. The charging device according to claim 12, wherein at least one actuator is configured to move the platform, the at least one actuator being provided at the platform, a holder connecting the charging plug to the platform, or the main body.

14. The charging device according to claim 1, the charging device comprising a control system comprising a controller and a sensor, wherein the controller is configured to: receive a signal from the sensor; determine control signals based on the signal;
   and send the control signals to move the charging plug and to insert the charging plug into the charging portal.

15. The charging device according to claim 14, wherein the sensor is a single two-dimensional camera attached at the charging plug.

16. The charging device according to claim 14,
   wherein the sensor is configured to provide the signal as an image or video signal,
   wherein the control system is configured to operate a convolutional neural network, the convolutional neural network being trained to infer positions of at least one of the distal end of the arm, the charging plug, or the charging portal from the image or video signal, and
   wherein the control system, using the convolutional neural network, is configured to: interpret the signal received from the sensor to perform at least one of image recognition, image classification, or pose estimation; and determine the positions of at least one of the arm, the charging plug, or the charging portal based on at least one of the image recognition, the image classification, or the pose estimation.

17. The charging device according to claim 14, the charging device comprising:
   a plurality of motors collectively configured to position the distal end of the arm within a working volume defined by a vertical axis, a longitudinal axis, and a lateral axis,
   at least one actuator configured to tilt the charging plug,
   wherein the controller is configured to:
      detect positions of at least one of: the distal end of the arm, the charging plug, or the charging portal based on the signal from the sensor;
      send motor control signals that are configured to controllably operate the motors to position and orient the arm within the working space to a position where the charging portal is reachable by the charging plug;
      send actuator control signals that are configured to adjust the orientation or the position of the charging plug to align the charging plug with the charging portal;
      send the motor control signals that are configured to operate the motors to insert the charging plug into the charging portal; and
      send the motor control signals that are configured to retract the arm to its fully retracted state.

18. The charging device according to claim 14, wherein the control system comprises:

motor sensors configured to detect states of the plurality of motors and the at least one actuator and provide corresponding feedback signals;

a motor controller configured to: receive the feedback signals, the motor control signals, and the actuator control signals; determine motor driver signals and actuator driver signals based on the feedback signals, the motor control signals, and the actuator control signals; and send the motor driver signals and the actuator driver signals to at least one motor driver; and the at least one motor driver, which is configured to: receive the motor driver signals and the actuator driver signals; and send individual operation signals to the motors and the at least one actuator based on the motor driver signals and the actuator driver signals.

19. The charging device according to claim 14, wherein the controller is configured to send user interface signals to a user interface, the user interface signals corresponding to at least one of localization information, position feedback information, or charging information, wherein the user interface comprises at least one of: a local interface in the charging device, a projector in the charging device configured to project an image, or a remote interface.

20. A cassette for controllably extending and retracting a rigid chain, the rigid chain being compliant in a first direction from a neutral axis and resistant in an opposite second direction past the neutral axis, the cassette comprising:

a main bracket;

a gear wheel rotatably mounted in the main bracket, the gear wheel being controllably rotatable about a gear wheel axis; and a feeding chute at least partially surrounding the gear wheel, the feeding chute having a first side wall, a second side wall, and a base, wherein the first side wall, the second side wall, and the base form a channel to guide the rigid chain, an exit side of the channel forming a feed point that is configured to direct an exit of the rigid chain, wherein the feeding chute is configured such that the base holds a portion of the rigid chain in communication with the gear wheel.

* * * * *